(12) United States Patent  
Giganti et al.

(10) Patent No.: US 9,417,894 B1  
(45) Date of Patent: Aug. 16, 2016

(54) METHODS AND APPARATUS FOR A TABLET COMPUTER SYSTEM INCORPORATING A REPROGRAMMABLE CIRCUIT MODULE

(71) Applicant: Ryft Systems, Inc., Rockville, MD (US)

(72) Inventors: John Giganti, Damascus, MD (US); Richard Baum, Rockville, MD (US); Ann Nelson Bibbee, Herndon, VA (US); Timothy Patrick Bresnan, Finksburg, MD (US); Andrew Huo, Rockville, MD (US); Thuy-Tien Thi Nguyen, Arlington, VA (US); Harry Todd Shockey, Mount Airy, MD (US); Peter Reza Wihl, Bethesda, MD (US)

(73) Assignee: Ryft Systems, Inc., Rockville, MD (US)

( * ) Notice: Subject to any disclaimer, the term of this patent is extended or adjusted under 35 U.S.C. 154(b) by 235 days.

(21) Appl. No.: 14/213,903

(22) Filed: Mar. 14, 2014

Related U.S. Application Data

(60) Provisional application No. 61/783,998, filed on Mar. 14, 2013.

(51) Int. Cl.
G06F 9/00 (2006.01)
G06F 9/445 (2006.01)

(52) U.S. Cl.
CPC .................................. *G06F 9/44505* (2013.01)

(58) Field of Classification Search
CPC ... G06F 9/44526; G06F 9/44508; G06F 8/65; G06F 9/44502; G06F 15/7867
See application file for complete search history.

(56) References Cited

U.S. PATENT DOCUMENTS

| 5,479,638 | A | 12/1995 | Assar et al. |
| 5,862,223 | A | 1/1999 | Walker et al. |
| 6,611,894 | B1 | 8/2003 | Onoo |
| 6,640,220 | B1 | 10/2003 | Firlit et al. |
| 6,738,631 | B1 * | 5/2004 | Adler ............... G06K 9/00664 340/12.51 |
| 7,202,801 | B2 | 4/2007 | Chou |

(Continued)

FOREIGN PATENT DOCUMENTS

| EP | 2535820 | 12/2012 |
| GB | 2352548 | 1/2001 |

(Continued)

OTHER PUBLICATIONS

Office Action for U.S. Appl. No. 13/161,141, mailed Sep. 9, 2013.

(Continued)

*Primary Examiner* — Zahid Choudhury
(74) *Attorney, Agent, or Firm* — Cooley LLP

(57) ABSTRACT

A portable housing includes a sensing device, a set of memory modules, and a reconfigurable circuit module. The reconfigurable circuit module can be configured to receive sensed data associated with a sensing device. In response to receiving the sensed data, the reconfigurable circuit module can be configured to transition from a first configuration to a second configuration. While in the second configuration, the reconfigurable circuit module can be configured to retrieve data from at least one memory module from the set of memory modules. The reconfigurable circuit module can be configured to compare the retrieved data to the sensed data, and as a result, produce matched data. The reconfigurable circuit module can be configured to define and/or send a search result based on the matched data.

18 Claims, 7 Drawing Sheets

(56) References Cited

U.S. PATENT DOCUMENTS

| | | | |
|---|---|---|---|
| 7,452,236 B2 | 11/2008 | Verdiell et al. | |
| 7,464,088 B1 | 12/2008 | Chiang | |
| 7,500,055 B1 | 3/2009 | Oesterreicher et al. | |
| 7,542,867 B2 | 6/2009 | Steger et al. | |
| 7,562,162 B2 | 7/2009 | Kreiner et al. | |
| 7,657,453 B2 | 2/2010 | Guldner et al. | |
| 7,660,431 B2* | 2/2010 | Crenshaw | G06K 9/00979 382/100 |
| 7,713,068 B2 | 5/2010 | Flynn et al. | |
| 7,752,346 B2 | 7/2010 | Talayco et al. | |
| 7,778,020 B2 | 8/2010 | Flynn et al. | |
| 7,827,346 B2 | 11/2010 | Anderson | |
| 7,830,732 B2 | 11/2010 | Moshayedi et al. | |
| 7,831,606 B2 | 11/2010 | Pandya | |
| 7,836,226 B2 | 11/2010 | Flynn et al. | |
| 7,890,692 B2 | 2/2011 | Pandya | |
| 7,934,033 B2 | 4/2011 | Malwankar et al. | |
| 7,934,055 B2 | 4/2011 | Flynn et al. | |
| 8,015,440 B2 | 9/2011 | Flynn et al. | |
| 8,019,938 B2 | 9/2011 | Flynn et al. | |
| 8,019,940 B2 | 9/2011 | Flynn et al. | |
| 8,046,500 B2 | 10/2011 | Flynn et al. | |
| 8,051,022 B2 | 11/2011 | Pandya | |
| 8,074,011 B2 | 12/2011 | Flynn et al. | |
| 8,103,137 B2 | 1/2012 | Kirkpatrick et al. | |
| 8,134,875 B2 | 3/2012 | Baxter | |
| 8,140,739 B2 | 3/2012 | Langlois et al. | |
| 8,250,271 B2 | 8/2012 | Swing et al. | |
| 8,499,132 B1 | 7/2013 | Pasupathy et al. | |
| 8,838,873 B2 | 9/2014 | Giganti et al. | |
| 8,973,154 B2 | 3/2015 | Yanagihara | |
| 2001/0033012 A1 | 10/2001 | Kommerling et al. | |
| 2001/0047394 A1 | 11/2001 | Kloba et al. | |
| 2002/0065902 A1 | 5/2002 | Janik et al. | |
| 2003/0204664 A1 | 10/2003 | Bennett | |
| 2003/0225942 A1 | 12/2003 | Cheon | |
| 2004/0143716 A1 | 7/2004 | Hong | |
| 2004/0177256 A1 | 9/2004 | Kobayashi | |
| 2005/0198449 A1 | 9/2005 | Haskell et al. | |
| 2006/0034461 A1 | 2/2006 | Park | |
| 2006/0294059 A1 | 12/2006 | Chamberlain et al. | |
| 2007/0055831 A1 | 3/2007 | Beeston et al. | |
| 2007/0067373 A1 | 3/2007 | Higgins et al. | |
| 2007/0143273 A1* | 6/2007 | Knaus | G06F 17/30616 |
| 2007/0143532 A1 | 6/2007 | Gorobets et al. | |
| 2007/0277036 A1 | 11/2007 | Chamberlain et al. | |
| 2008/0140724 A1 | 6/2008 | Flynn et al. | |
| 2008/0140909 A1 | 6/2008 | Flynn et al. | |
| 2008/0140910 A1 | 6/2008 | Flynn et al. | |
| 2008/0140932 A1 | 6/2008 | Flynn et al. | |
| 2008/0140945 A1 | 6/2008 | Salessi et al. | |
| 2008/0141043 A1 | 6/2008 | Flynn et al. | |
| 2008/0155268 A1* | 6/2008 | Jazayeri | G06F 21/32 713/186 |
| 2008/0183688 A1 | 7/2008 | Chamdani et al. | |
| 2008/0183882 A1 | 7/2008 | Flynn et al. | |
| 2008/0183953 A1 | 7/2008 | Flynn et al. | |
| 2008/0228740 A1 | 9/2008 | Weiss et al. | |
| 2008/0263114 A1 | 10/2008 | Nath et al. | |
| 2008/0313312 A1 | 12/2008 | Flynn et al. | |
| 2008/0313364 A1 | 12/2008 | Flynn et al. | |
| 2009/0012957 A1* | 1/2009 | Villaret | G06F 7/02 |
| 2009/0089591 A1* | 4/2009 | Mattsson | G06F 21/6227 713/193 |
| 2009/0094218 A1 | 4/2009 | Zhang et al. | |
| 2009/0122949 A1 | 5/2009 | Reid et al. | |
| 2009/0150605 A1 | 6/2009 | Flynn et al. | |
| 2009/0150641 A1 | 6/2009 | Flynn et al. | |
| 2009/0150744 A1 | 6/2009 | Flynn et al. | |
| 2009/0245245 A1 | 10/2009 | Malwankar et al. | |
| 2009/0254705 A1 | 10/2009 | Abali et al. | |
| 2009/0259800 A1 | 10/2009 | Kilzer et al. | |
| 2009/0282301 A1 | 11/2009 | Flynn et al. | |
| 2009/0287956 A1 | 11/2009 | Flynn et al. | |
| 2009/0296859 A1 | 12/2009 | Faulhaber et al. | |
| 2010/0023675 A1 | 1/2010 | Chen et al. | |
| 2010/0031000 A1 | 2/2010 | Flynn et al. | |
| 2010/0095064 A1 | 4/2010 | Aviles | |
| 2010/0115174 A1 | 5/2010 | Akyol et al. | |
| 2010/0122019 A1 | 5/2010 | Flynn et al. | |
| 2010/0122148 A1 | 5/2010 | Flynn et al. | |
| 2010/0211737 A1 | 8/2010 | Flynn et al. | |
| 2010/0235715 A1 | 9/2010 | Thatcher et al. | |
| 2010/0253470 A1* | 10/2010 | Burke | G06K 9/00885 340/5.82 |
| 2010/0254096 A1 | 10/2010 | Kim et al. | |
| 2010/0254100 A1 | 10/2010 | Kim et al. | |
| 2010/0254703 A1 | 10/2010 | Kirkpatric et al. | |
| 2010/0262762 A1 | 10/2010 | Borchers et al. | |
| 2010/0293439 A1 | 11/2010 | Flynn et al. | |
| 2010/0293440 A1 | 11/2010 | Thatcher et al. | |
| 2011/0004771 A1 | 1/2011 | Matsushima et al. | |
| 2011/0022801 A1 | 1/2011 | Flynn et al. | |
| 2011/0029695 A1 | 2/2011 | Kishore et al. | |
| 2011/0035540 A1 | 2/2011 | Fitzgerald et al. | |
| 2011/0047356 A2 | 2/2011 | Flynn et al. | |
| 2011/0047437 A1 | 2/2011 | Flynn | |
| 2011/0055433 A1 | 3/2011 | Kishore et al. | |
| 2011/0055471 A1 | 3/2011 | Thatcher et al. | |
| 2011/0058440 A1 | 3/2011 | Smith et al. | |
| 2011/0060887 A1 | 3/2011 | Thatcher et al. | |
| 2011/0060927 A1 | 3/2011 | Fillingim et al. | |
| 2011/0066808 A1 | 3/2011 | Flynn et al. | |
| 2011/0072302 A1 | 3/2011 | Sartore | |
| 2011/0119423 A1 | 5/2011 | Kishore et al. | |
| 2011/0157992 A1 | 6/2011 | Strasser et al. | |
| 2011/0179225 A1 | 7/2011 | Flynn et al. | |
| 2011/0182119 A1 | 7/2011 | Strasser et al. | |
| 2011/0197014 A1 | 8/2011 | Yeh | |
| 2011/0252190 A1 | 10/2011 | Flynn et al. | |
| 2011/0258391 A1 | 10/2011 | Atkisson et al. | |
| 2011/0258512 A1 | 10/2011 | Flynn et al. | |
| 2011/0289267 A1 | 11/2011 | Flynn et al. | |
| 2011/0296133 A1 | 12/2011 | Flynn et al. | |
| 2011/0296277 A1 | 12/2011 | Flynn et al. | |
| 2011/0307758 A1 | 12/2011 | Filligim | |
| 2011/0314354 A1 | 12/2011 | Fillingim | |
| 2012/0005443 A1 | 1/2012 | Flynn et al. | |
| 2012/0011340 A1 | 1/2012 | Flynn et al. | |
| 2012/0030408 A1 | 2/2012 | Flynn et al. | |
| 2012/0117318 A1 | 5/2012 | Burton et al. | |
| 2012/0239854 A1 | 9/2012 | Hsueh et al. | |
| 2012/0324143 A1 | 12/2012 | Giganti et al. | |
| 2013/0151924 A1* | 6/2013 | Beadle | H04L 69/04 714/763 |
| 2014/0223165 A1* | 8/2014 | Rahman | G06F 9/4401 713/100 |

FOREIGN PATENT DOCUMENTS

| | | |
|---|---|---|
| WO | WO 98/57489 | 12/1998 |
| WO | WO 2005/026925 | 3/2005 |
| WO | WO 2008/077284 | 7/2008 |
| WO | WO 2012/174043 | 2/2012 |

OTHER PUBLICATIONS

Office Action for U.S. Appl. No. 13/161,141, mailed Mar. 14, 2013.
Office Action for European Application No. 12172152.6, mailed Dec. 13, 2013.
Partial European Search Report for European Application No. 12172152.6, mailed Jan. 8, 2013.
Examination Report for United Kingdom Application No. 1210639.9, dated Jul. 2, 2014.
Examination Report for United Kingdom Application No. 1210639.9, dated Jan. 27, 2014.
Further Search Examination Report Relating to Claims 12 to 19 for United Kingdom Application No. 1210639.9, dated Jan. 22, 2014.
Further Search Examination Report Relating to Claims 27 to 41 for United Kingdom Application No. 1210639.9, dated Jan. 24, 2014.
Further Search Examination Report Relating to Claims 42 to 46 for United Kingdom Application No. 1210639.9, dated Jan. 24, 2014.
Search and Examination Report for United Kingdom Application No. 1210639.9, dated Oct. 15, 2012.

(56) References Cited

OTHER PUBLICATIONS

Office Action U.S. Appl. No. 13/532,319, mailed Sep. 23, 2013.
Office Action U.S. Appl. No. 13/532,319, mailed Mar. 21, 2013.
Office Action U.S. Appl. No. 13/532,319, mailed Nov. 21, 2012.
Office Action U.S. Appl. No. 13/532,319, mailed Apr. 2, 2014.
International Search Report and Written Opinion for International Application No. PCT/US2012/042143, mailed Nov. 8, 2012.
Singh et al., "Technical Overvew & Comparative Study of Modern Tablet Computers from Different Vendors Like Apple, Samsung & HTC.," publication date May 24, 2011 Retrieved from the Internet: <URL: http://www-scf.usc.edu/~shailend/EE532ProjectReport.pdf>, 19 pages.
Liu et al., "Run-Time Partial Reconfiguration Speed Investigation and Architectural Design Space Exploration," published in: Field Programmable Logic and Applications, 2009, FPL 2009, IEEE, Retrieved from the Internet: <URL: http://web.it.kth.se/~mingliu/publications/fpl09.pdf>, 5 pages.
Wikipedia, Field-programmable gate array, Retrieved from the internet: URL: <http;//en.wikipedia.org/wiki/Field-programmable$_{13}$ gate_array>, [Retrieved on Jul. 31, 2014], 17 pages.
Office Action for U.S. Appl. No. 14/213,914, mailed Sep. 15, 2015, 9 pages.

\* cited by examiner

500

```
┌─────────────────────────────────────────────┐
│ Receive a representation of sensed data      │
│ from a sensing device.                       │
│ 502                                          │
└─────────────────────────────────────────────┘
                    │
                    ▼
┌─────────────────────────────────────────────┐
│ Retrieve, based on the representation of the │
│ sensed data, data stored in the plurality of │
│ memory modules                               │
│ 504                                          │
└─────────────────────────────────────────────┘
                    │
                    ▼
┌─────────────────────────────────────────────┐
│ Compare the retrieved data to the            │
│ representation of the sensed data to produce │
│ matched data                                 │
│ 506                                          │
└─────────────────────────────────────────────┘
                    │
                    ▼
┌─────────────────────────────────────────────┐
│ Send a data match result based on the        │
│ matched data                                 │
│ 508                                          │
└─────────────────────────────────────────────┘
```

FIG. 5

METHODS AND APPARATUS FOR A TABLET COMPUTER SYSTEM INCORPORATING A REPROGRAMMABLE CIRCUIT MODULE

CROSS-REFERENCE TO RELATED APPLICATIONS

This application claims priority to and the benefit of U.S. Provisional Patent Application No. 61/783,998, filed Mar. 14, 2013, and entitled "Method and Apparatus for Tablet Computer System," which is incorporated herein by reference in its entirety.

This application is related to U.S. patent application Ser. No. 13/161,141, filed on Jun. 15, 2011 and entitled "Methods and Apparatus for Data Access by a Reprogrammable Circuit Module;" U.S. patent application Ser. No. 13/532,319, filed on Jun. 25, 2012 and entitled "Methods and Apparatus for Data Access by a Reprogrammable Circuit Module;" and U.S. patent application Ser. No. 14/213,914, filed on Mar. 14, 2014 and entitled "Methods and Apparatus for a Tablet Computer System Incorporating a Reprogrammable Circuit Module," each of which is incorporated herein by reference in its entirety.

BACKGROUND

Some of the embodiments described herein relate to data processing systems, and, in particular, to methods and apparatus for a tablet computer system incorporating large quantities of flash storage, a reconfigurable logic device, and one or more sensing devices for searching, retrieving, filtering and/or abstracting data in a high speed fashion using a portable battery powered data processing system in a tablet form factor.

Some known systems use field-based personnel to process data acquired at the point of collection against a database. Such known systems typically adopt one of three known methods. The first method is to send queries via some form of network connection to datacenter-based servers. Such a method, however, requires that a network connection is constantly and continuously available. The second method requires the field-based personnel to physically return the data to a location where a network connection is available. The third method is to search a small subset of a database contained on a portable device, such as a tablet, at the point of collection via a power-intensive, battery draining, high-temperature CPU-based processor. Such known portable devices do not contain suitable technology, such as, for example, the processing power and/or the storage capacity to perform high-speed data processing associated with datasets. For example, some known systems use memories operatively coupled to processors using address buses. Such address buses, for example, can be limited by a width of the buses. Consequently, such systems can be insufficient for high-speed data processing where bus width is a limiting factor.

Accordingly, a need exists for improved systems and methods for performing data collection and processing via a portable high-speed parallel data processing tablet form factor device.

SUMMARY

A portable housing includes a sensing device, a set of memory modules, and a reconfigurable circuit module. The reconfigurable circuit module can be configured to receive sensed data associated with a sensing device. In response to receiving the sensed data, the reconfigurable circuit module can be configured to transition from a first configuration to a second configuration. While in the second configuration, the reconfigurable circuit module can be configured to retrieve data from at least one memory module from the set of memory modules. The reconfigurable circuit module can be configured to compare the retrieved data to the sensed data, and as a result, produce matched data. The reconfigurable circuit module can be configured to define and/or send a search result based on the matched data.

BRIEF DESCRIPTION OF THE DRAWINGS

FIG. 5 is a flow chart illustrating a method for executing a data match process on multiple memory modules, according to an embodiment.

DETAILED DESCRIPTION

Figure 1:
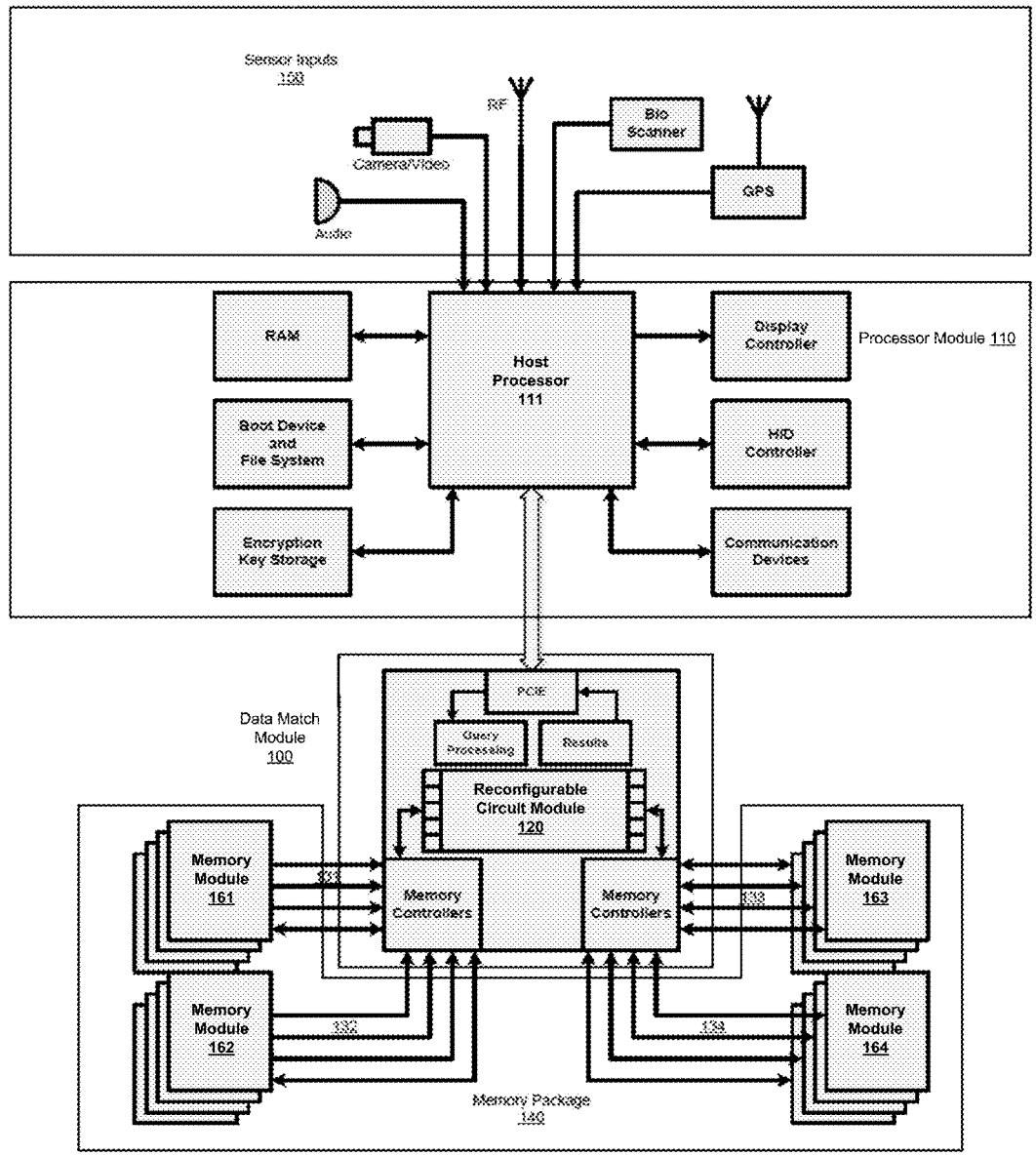
FIG. 1 is a schematic illustration of a tablet computer system, according to an embodiment.

Some embodiments described herein relate to a portable apparatus and/or housing (e.g., a portable high-speed data processing tablet form factor device) having a set of memory modules (e.g., flash memory) and a reconfigurable circuit module (e.g., a field-programmable gate array (FPGA)), which may include a set of reconfigurable logic components. The portable housing can include a host processor. The set of memory modules can be configured to store data. The reconfigurable circuit module can be operatively coupled to the set of memory modules via, for example, memory buses. In some embodiments, the memory buses, for example, can be approximately a hundred bits wide. For another example, in some embodiments, the memory buses can be approximately a thousand bits wide. In some instances, the reconfigurable circuit module can be operatively coupled to the host processor. The host processor and/or the reconfigurable circuit module can be operatively coupled to a set of sensing devices (e.g., a biometric sensor, a camera, a position sensor, etc.). In some embodiments, at least a portion of the set of sensing devices and/or the host processor can be located in and/or on a second housing separate from the housing having the reconfigurable circuit module.

The reconfigurable circuit module can be configured to receive a representation of sensed data (e.g., data associated with a person's fingerprint) generated, received, and/or accessed at a sensing device (e.g., a biometric sensor). The reconfigurable circuit module can be configured to receive a search and/or data match request from the host processor. The request can either include or exclude a set of addresses (e.g., physical address, logical address) of data stored at the set of memory modules. The reconfigurable circuit module can be configured to transition from a first configuration to a second configuration in response to receiving the representation of the sensed data, the search request, and/or the data match request. The transition from the first configuration to the second configuration can include reconfiguring a logic component (e.g., logic gate) or set of logic components of the reconfigurable circuit module. In some embodiments, a set of logic components can be reconfigured according to a first criterion for a first data match request, and the set of logic components can be reconfigured according to a second criterion for a second data match request. For example, logic gates can be reconfigured based on a data match request and/or sensed data. In some embodiments, logic gates can be reconfigured in response to and/or based on an indication from a user of the tablet computer system. In other embodiments, logic gates can be reconfigured in response to and/or based on an indication from a processor module and/or sensor inputs.

The reconfigurable circuit module can be configured to retrieve, based on the representation of the sensed data and when in the second configuration, data stored in the set of memory modules via, for example, a memory bus or a set of memory buses. In some embodiments, before retrieving data stored in the set of memory modules, the reconfigurable circuit module can be configured to determine, based on the representation of the sensed data and when in the first configuration or the second configuration, a set of addresses of data to be searched, retrieved, and/or matched. The set of addresses can be associated with a data type, a category of data, a data source, a sensing device, or a memory module from the set of memory modules. In such instances, for example, the reconfigurable circuit module can be configured to retrieve the data stored in the set of memory modules based at least in part on the set of addresses. The reconfigurable circuit module can be configured to compare the retrieved data to the representation of the sensed data to produce matched data (e.g., matched data can include (1) stored data and/or retrieved data that at least partially matches the representation of the sensed data, and/or (2) stored data and/or retrieved data that completely and/or exactly matches the representation of the sensed data). The reconfigurable circuit module can be configured to send a search result and/or a data match result based on the matched data, a type of data matching, and/or in response to the comparison.

In some embodiments, the reconfigurable circuit module can be configured to receive the representation of the sensed data from the host processor. In other embodiments, the reconfigurable circuit module can be configured to receive the representation of the sensed data directly from a sensing device and not via the host processor. In some instances, the reconfigurable circuit module can be configured to receive a representation of first sensed data from a host processor and a representation of second sensed data different than the first sensed data directly from a sensing device and not via the host processor. Whether the reconfigurable circuit module receives a representation of sensed data from the host processor and/or directly from the sensing device can be based on a criterion. For example, the reconfigurable circuit module can be configured to receive the representation of the sensed data from the host processor when a frequency associated with the sensed data meets a criterion. Further to this example, the reconfigurable circuit module can be configured to receive the representation of the sensed data directly from the sensing device and not via the host processor when the frequency associated with the sensed data does not meet the criterion.

In some embodiments, the set of memory modules can be configured to store encrypted data configured to be decrypted with a decryption key. The set of memory modules can be configured to store at least a portion of the decryption key such that the at least the portion of the decryption key is deleted in response to receiving an indication from a user.

In some embodiments, a first portable housing can have a reconfigurable circuit module, a set of memory modules operatively coupled to the reconfigurable circuit module, and a heat sink. The first portable housing can include a set of protrusions. The set of protrusions can be configured to transfer thermal energy from the reconfigurable circuit module to an area external to the first portable housing. A second portable housing can be removably or permanently coupled to the first portable housing. The first portable housing can be disposed within the second portable housing. At least a portion of a cooling device can be disposed between the first portable housing and the second portable housing. As such, the cooling device can be configured to transfer thermal energy from the set of protrusions to an area external to the second portable housing. In some embodiments, the first portable housing can be substantially hermetically sealed (e.g., substantially impenetrable to liquid).

In some embodiments, the first portable housing and/or the second portable housing can be monolithically formed.

In some embodiments, the first portable housing can include an actuator configured to cause deletion of a decryption key associated with encrypted data stored at a memory module from the set of memory modules. In some embodiments, at least a portion of the actuator can be disposed within and/or on the second portable housing.

In some embodiments, the reconfigurable circuit module has multiple side portions, each side portion from the multiple side portions is disposed adjacent to a memory module from the set of memory modules. As such, thermal energy generated at the reconfigurable circuit module can be distributed (e.g., via conduction) such that thermal energy build-up in any one particular area can be limited. For example, the memory modules from the set of memory modules can be disposed relative to the reconfigurable circuit module such that thermal energy can be distributed in a substantially symmetrical and/or even pattern. In this manner, thermal energy build-up in any one particular area can be limited.

In some embodiments, a first portable apparatus (e.g., a tablet) includes a set of memory modules, a reprogrammable circuit module and a set of data channels. In such embodiments, a second portable apparatus (e.g., a tablet, a Smartphone, etc.) includes a processor and a user-interface module. In some embodiments, the second portable apparatus includes and/or is operatively coupled to a sensing device. In such embodiments, the processor can be configured to receive sensed data generated at the sensing device. The reprogrammable circuit module can be operatively coupled to the processor of the second portable apparatus. As such, the reprogrammable circuit module can receive instructions from and/or sensed data via the processor. Further to this example, the reprogrammable circuit module can be configured to compare data retrieved from the set of memory modules to the sensed data. The reprogrammable circuit module can be configured to send a search and/or data match result based on the compared data to the processor at the second portable apparatus.

FIG. 1 is a schematic block diagram of a tablet computer system 101. As shown in FIG. 1, the tablet computer system 101 includes a set of sensor inputs 150, a processor module 110, a data match module 100, and a memory package 140.

In some embodiments, the sensor inputs 150 include a camera, a video recorder, an audio capture device, a bio scanner, and/or a global positioning system (GPS). In some embodiments, the sensor inputs 150 can include any type of sensing device (shown or not shown in FIG. 1) such as, for example, an embedded camera, a position sensor, a microphone, a radio frequency (RF) communication module, an accelerometer and/or the like. The biometric scanner, for example, can include a fingerprint scanner, iris scanner, a DNA capture device, and/or the like. The sensor inputs 150 can receive and/or capture data. For example, a biometric scanner can scan a person's fingerprint. In some embodiments, as discussed further herein, the sensor inputs 150 can sense data and subsequently the sensed data to the processor module 110 and/or the data match module 100.

In some embodiments, the processor module 110 can include a host processor 111. In some embodiments, the host processor 111 can be a general purpose processor, a Field Programmable Gate Array (FPGA), an Application Specific Integrated Circuit (ASIC), a Digital Signal Processor (DSP), a Network Processor (NP), a Graphics Processing Unit (GPU), and/or the like. The host processor 111 can be configured to run and/or execute applications and/or other modules, processes and/or functions including, for example, modules, processes and functions associated with a tablet computer system 101 and/or a data match system.

In some embodiments, the processor module 110 can include a random-access memory (RAM), a boot device, a file system, an encryption key storage device, a display controller, a display backlight controller such as a light emitting diode (LED) controller, a high intensity discharge (HID) controller and/or any other suitable device and/or module.

In some embodiments, the data match module 100 includes one or more memory controllers, a reconfigurable circuit module 120, and/or a Peripheral Component Interconnect Express (PCIe) bus. In some embodiments, the memory controllers can access and/or control the data match module 100. In some embodiments, a PCIe format allows multiple Flash Processing Element (FPE) boards, including an expansion board 400 as discussed further herein (e.g., FIG. 4), to be used in a variety of configurations from single board applications to systems needing hundreds of FPEs. These FPE boards (i.e., PCIe cards) are physically compatible with common full length Peripheral Component Interconnect (PCI) slots of a PC, a PCIe expansion chassis, and/or a PCIe slot in the tablet computer system 101. Furthermore, such a PCIe card can be connected to a motherboard or a host processor (e.g., host processor 111) via a high speed serial data or command interface over a multi-lane PCIe channel, which can provide a large data rate (e.g. 5G bytes/sec).

In some embodiments, the reconfigurable circuit module 120 can be, for example, a field-programmable gate array (FPGA). In such embodiments, the data match module 100 can contain code (e.g., in hardware and/or hardware executing software) specific to the data collection function and/or a data processing function. In some embodiments, the data match module 100 (as an FPGA module) can be an FPGA-flash processing module containing one or more FGPAs. In some embodiments, although not shown in FIG. 1, the tablet computer system 101 can include other types of reprogrammable circuit modules, instead of or in addition to the data match module 100 (e.g., as an FPGA module), which perform the data collection function and/or the data processing function of the data match module 100 as described herein. Such reprogrammable circuit modules can be similar to the reprogrammable circuit module described in U.S. patent application Ser. No. 13/161,141, filed on Jun. 15, 2011 and entitled "Methods and Apparatus for Data Access by a Reprogrammable Circuit Module," and U.S. patent application Ser. No. 13/532,319, filed on Jun. 25, 2012 and entitled "Methods and Apparatus for Data Access by a Reprogrammable Circuit Module," each of which is incorporated by reference herein in its entirety. In some other embodiments, for example, a reprogrammable circuit module included in the tablet computer system 101 can be an Application-Specific Integrated Circuit (ASIC) or any other suitable Programmable Logic Device (PLD), such as a Programmable Logic Array (PLA), a Programmable Array Logic (PAL), a Complex Programmable Logic Device (CPLD), etc.

Figures 2, 3:
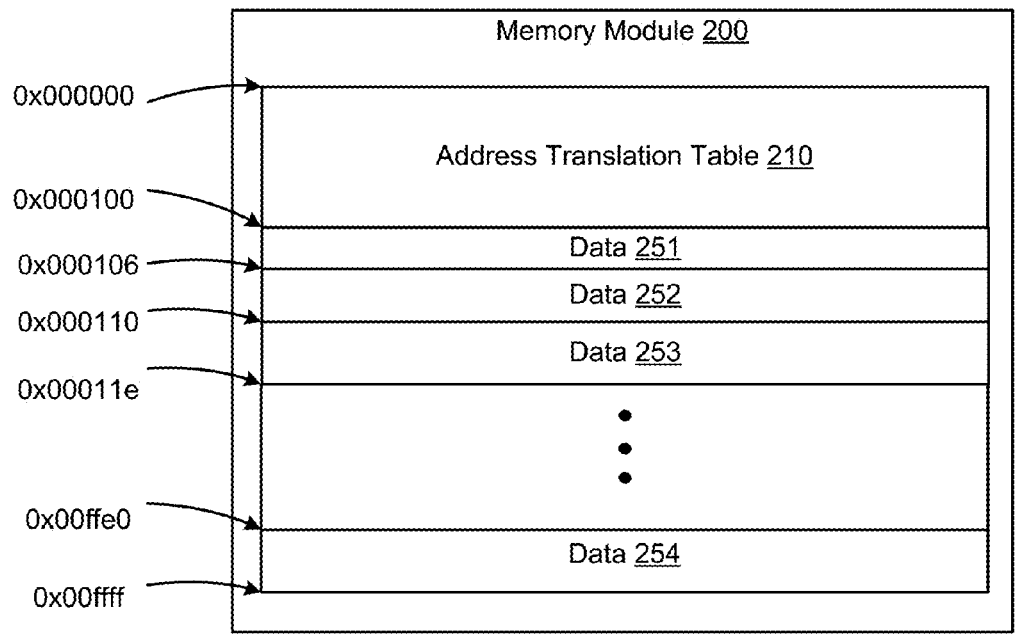
FIG. 2 is a schematic illustration of structure of a memory module, according to an embodiment.
FIG. 3 is a schematic illustration of an address translation table stored in a memory module, according to an embodiment.

In some embodiments, the memory package 140 includes one or more memory modules. For example, in some embodiments and as shown in FIG. 1, the memory package 140 can include four memory modules 161-164. A memory package 140 can include, for example, a random access memory (RAM), a memory buffer, a hard drive, a database, an erasable programmable read-only memory (EPROM), an electrically erasable read-only memory (EEPROM), a read-only memory (ROM), a Double Data Rate Synchronous Dynamic Random-Access Memory (e.g., DDR SDRAM, DDR2 SDRAM, DDR3 SDRAM), Flash Memory, and/or any other suitable type of memory. In some embodiments, memory package 140 can include memory modules of various types. In such embodiments, for example, memory module 161 can be a DDR memory, and memory module 162 can be a Flash Memory. An example of a structure of a memory module (e.g., similar to memory modules 161-164) is shown in FIG. 2, described as memory module 200, and further described herein.

In some embodiments, sensor inputs 150 are operatively coupled to a processor module 110, a data match module 100, and/or a memory package 140 via a network, a wireless connection, and/or a wired connection. Such a network, for example, can be any type of network (e.g., a local area network (LAN), a wide area network (WAN), a virtual network, Bluetooth, WI-Max, and/or a telecommunications network) implemented as a wired network and/or wireless network. In some embodiments, for example, sensor inputs 150 can be connected to the processor module 110 via an intranet, an Internet Service Provider (ISP) and the Internet, a cellular network, and/or the like. Such a wired connection, for example, can be any type of wired connection (e.g., USB, Ethernet, Fiber Optic, FireWire, etc.).

In some embodiments, the host processor 111 is operatively coupled to a RAM, a Boot Device and File System, an Encryption Key storage, a display controller, a HID controller, and/or one or more communication devices via a network connection, a wireless connection, and/or a wired connection. Such connections are discussed further herein.

In some embodiments, the processor module 110 is operatively coupled to the data match module 100 and/or the memory package 140 via a network connection, a wireless connection, and/or a wired connection. Such connections are discussed further herein. In some embodiments, for example, the host processor 111 can be operatively coupled to a PCIe connector of the data match module 100. As such, the host processor 111 can be sent data to the data match module 100, such as for example, a data match request. Further to this example, the host processor 111 can receive data from the data match module 100.

In some embodiments, the PCIe is operatively coupled to the reconfigurable circuit module 120 and/or one or more memory controllers via a network connection, a wireless connection, and/or a wired connection. Such connections are discussed further herein. In such embodiments, for example, a memory controller can access, send data to, receive data from, and/or control memory modules of the memory package 140 via one or more memory buses. For example, as shown in FIG. 1, the memory controllers of the data match module 100 are connected to the memory modules 161, 162, 163 and 164 via the memory buses 131, 132, 133 and 134, respectively. In some embodiments, the memory buses 131, 132, 133 and 134 can be used as parallel channels such that data can be retrieved from the memory modules 161, 162, 163 and 164 in parallel (i.e., substantially simultaneously) to the data match module 100. Any number of channels can be implemented. For example, in some embodiments, 30-40 channels can be used. Such channels, for example, can provide data widths that are hundreds and/or thousands of bits wide. As such, the data match module 100 can interface with the processor module 110 to facilitate high speed data match requests to data stored in the memory package 140. In such embodiments, the data match module 100 can interface with the processor module 110 to facilitate high speed data match requests to data stored in the memory package 140. In some embodiments, the data channels can be wide data channels so as to permit substantially simultaneous parallel access to a portion of memory modules and/or a full set of memory modules (e.g., all of the memory modules from the memory package 140).

In use, the sensor inputs 150 can receive, capture, and/or generate sensed data. For example, an audio recording device can receive and/or capture audio signals generated by a person. The sensor inputs 150 can be operatively coupled to the processor module 110, the data match module 100, and/or the memory package 140. As such, the sensor inputs 150 can send the sensed data to the host processor module 110. Each sensing device 150 can communicate with and send sensed data (e.g., image data, audio data or any other type of data) to the processor module 110 for processing and/or forwarding (e.g., pass-through). For example, an embedded camera of the tablet computer system 101 can capture an image and send the associated image data to the processor module 110. For another example, an audio capture device (e.g., a microphone) of the tablet computer system 101 can capture an audio clip and send the associated audio data to the processor module 110.

In some embodiments, the sensor inputs 150 can send the sensed data directly to the data match module and not via the processor module 110. In yet other embodiments, as discussed in further detail herein, the sensor inputs 150 can send sensed data to the data match module 100 via the processor module 110 incorporating a pass-through function such that the sensed data can pass through the processor module 110 and receive no processing therein.

The host processor 111 can be operatively coupled to peripheral devices, such as, for example, the peripheral devices in FIG. 1 (e.g., RAM, boot device and file system, encryption key storage, display controller, HID controller, communication devices). Further, in some embodiments, the host processor 111 can be operatively coupled to the data match module 100, the memory package 140, and/or the sensor inputs 150.

In some embodiments, the processor module 110 can receive sensed data from the sensor inputs 150, for example, at the host processor 111. In such embodiments, in response to receiving the sensed data from sensor inputs 150, the host processor 111 can send a data match request, based on the sensed data, to the data match module 100. In some embodiments, the data match request can include the sensed data and/or a representation of the sensed data.

In some embodiments, the processor module 110 can process the sensed data to produce processed sensed data. Such processing can include producing sensed data having a desired format. For example, the processor module 110 can process sensed data to produce sensed data having a format associated with the data match module 100 and/or the memory package 140. In some embodiments, the host processor 111 can translate, normalize, and/or filter the sensed data. Such translation, normalization, and/or filtration, for example, can be based on a predetermined criterion, the data match module 100, and/or the memory package 140.

In some embodiments, the processor module 110 can define a data match request based on processed sensed data, translated sensed data, normalized sensed data, and/or filtrated sensed data. The data match request can include the sensed data, a representation of the sensed data, and/or the processed sensed data. A data match request can be, for example, associated with searching, matching (e.g., matching can include partially matching, completely matching, and/or exactly matching), and/or retrieving data. For example, a data match request associated with searching can include a request for an indication of whether or not data is stored in memory package 140. Further to this example, the data match request can include a request for an indication of whether or not data matching sensed data is stored in memory package 140.

In some embodiments, a data match request can include a request to retrieve data from memory package 140. In such instances, the data match request can include a request to compare and/or match the retrieved data to sensed data. For example, in response to receiving an image or a representation of an image from an image capture device of the sensor inputs 150, the processor module 110 can define a data match request to search, match, and/or retrieve an image that is substantially identical to the received image. For another example, in response to receiving an audio clip including a keyword, the processor module 110 can define a data match request to search, match, and/or retrieve audio clips that include that keyword. In other embodiments, the data match module 100, in response to receiving a data match request from the processor module 110, can retrieve a set of data, to be matched with sensed data at the data match module 100, from one or more memory modules (e.g., memory module 161-164) of the memory package 140 (e.g., via a graphical user interface (GUI)). Further to this example, the retrieved data can be compared to and/or matched with sensed data at the data match module 100.

In some embodiments, the data match request can be associated with one or more data formats and/or categories. For example, a data format can be associated with an audio data format (e.g., .wav), an image data format (e.g., .jpg), a video data format (e.g., .avi), and/or the like. As another example, the data match request can be associated with a category, such as a location (e.g., Asia), data associated with biometrics (e.g., fingerprints), and/or the like. In such embodiments, the data stored at the memory package 140 can be indexed. The data stored at the memory package 140 can be indexed, for example, by data format and/or category.

In some embodiments, a user application module (not shown in FIG. 1) executing at the processor module 110 can provide a high-level interface to the data match module 100. Such a user application module can allow a user of the tablet computer system 101 to initiate queries to the memory package 140. Additionally, the user application module can interface with the sensing devices 150 of the table computer system 101 to obtain data for processing and data matching at the data match module 100.

In some embodiments, the host processor 111 can receive user-instructions via a communication device. The user-instructions, for example, can include instructions to perform a data match function. In some embodiments, the user-instructions can include instructions to perform a data match function using sensed data and/or a representation of sensed data received from sensor inputs 150. In such instances, the host processor 111 can send a data match request to the data match module 100 in response to receiving user-instructions. In some embodiments, the data match request can include a representation of sensed data and/or a representation of user-instructions. In some embodiments, the representation of the user-instructions can be stored at the memory package 140. In some embodiments, a user application module (not shown in FIG. 1) executing at the processor module 110 can provide a high-level interface to the data match module 100. Such a user application module can allow a user of the tablet computer system 101 to initiate queries to the memory package 140. Additionally, the user application module can interface with the sensor inputs 150 of the table computer system 101 to obtain data for processing and data matching at the data match module 100.

As shown in FIG. 1, the data match module 100 includes a reconfigurable circuit module 120 configured to perform a data match and/or compare function. In response to receiving a data match request from the processor module 110, the reconfigurable circuit module 120 can retrieve data from the memory package 140 (e.g., via the memory buses 131-124), process the retrieved data (shown as "query processing" in FIG. 1), and provide a result (e.g., shown as "Results" in FIG. 1) of the processed data to the processor module 110. In such embodiments, the reconfigurable circuit module 120 can transition from a first configuration to a second configuration in response to receiving a representation of sensed data. Such transition, for example, can include reconfiguring one or more logic components of the reconfigurable circuit module 120. In some embodiments, the reconfigurable circuit module 120 can retrieve and process data based on the information in the data match request received from the processor module 110.

In some embodiments, the reconfigurable circuit module 120 can retrieve data stored in a memory segment unit (not shown) of a memory module (e.g., memory module 161). In some embodiments, for example, such data stored in the memory segment unit of the memory module 161 can be completely retrieved. In some other embodiments, the data stored in the memory segment unit can be partially retrieved by the reconfigurable circuit module 120. Further processing can be performed at the reprogrammable circuit module 120, or alternatively or in combination, at another component of processor module 110. In some embodiments, further processing, for example at the reprogrammable circuit module 120, can include searching, matching (e.g., matching to a representation of sensed data), translating, filtering, normalizing, and/or formatting (e.g., formatting according to data associated with the processor module 110 the retrieved data.

In some embodiments, the reconfigurable circuit module 120 can determine a set of addresses including data to be searched, matched, and/or retrieved based on a keyword included in the data match request. For another example, the reconfigurable circuit module 120 can compare retrieved data with the data included in the data match request, and determine the data match result based on the result of the comparison. In some embodiments, the reconfigurable circuit module 120 can perform a data match and/or process function in substantially real-time.

In some embodiments, the reconfigurable circuit module 120 can receive a representation of sensed data from the processor module 110. In other embodiments, the reconfigurable circuit module 120 can receive a representation of sensed data directly from sensor inputs 150. Whether the reconfigurable circuit module 120 receives a representation of sensed data from the processor module 110 or from sensor inputs 150 can depend on a predetermined criterion. The criterion, for example, can be a frequency associated with the sensed data. Further to this example, the reconfigurable circuit module 120 can receive a representation of sensed data from the processor module 110 when a frequency associated with the representation of the sensed data meets a criterion, and the reconfigurable circuit module 120 can receive a representation of sensed data directly from sensor inputs 150 and not via the processor module 110 when the frequency associated with the representation of the sensed data does not meet the criterion. For example, if sensor inputs 150 provides data at a frequency higher than host processor 111 can process, the data can be sent directly to the reconfigurable circuit module 120. In some embodiments, receiving a representation of sensed data directly from sensor inputs 150 can include routing of the representation of sensed data through the processor module 110 (e.g., via host processor 111), such that the processor module 110 serves as a pass-through conduit. In such embodiments, the host processor 111 can route sensed data received from sensor inputs 150 via the pass-through conduit when, for example, a frequency associated with the sensed data meets or does not meet a criterion. For example, the host processor 111 may route the sensed data received from sensor inputs 150 via the pass-through conduit when a frequency (e.g., as determined by the processor module 110) associated with the sensed data is above or below an acceptable or unacceptable frequency of the host processor 111. Similarly stated, in such instances, the host processor 111 can process the sensed data and/or define a data match request, as described in further detail herein, when the frequency associated with the sensed data meets or does not meet the criterion (e.g., when a frequency associated with the sensed data is above or below an acceptable or unacceptable frequency of the host processor 111).

In some embodiments, the reconfigurable circuit module 120 can store the retrieved data in a memory (e.g., (RAM), Static Random-Access Memory (SRAM)) at the reconfigurable circuit module 120. In such embodiments, data can be stored, consolidated and/or processed into memory local to the reconfigurable circuit module (e.g., SRAM). For example, in some embodiments, an address translation table can be stored, consolidated, and/or processed into a RAM of the processor module 110. In such embodiments, address data (e.g., a logical memory address, a physical memory address) can be stored, consolidated, and/or processed. In some instances, when the reconfigurable circuit module 120 is powered down, the stored, consolidated and/or processed data can be sent from the host processor 111 to the memory package 140. Such data, for example, can be stored one or more memory modules (e.g., memory modules 161-164) from the memory package 140.

In some embodiments, the tablet computer system 101 can be configured such that the processor module 110 cannot access the memory at the reconfigurable circuit module directly. In such embodiments, the reconfigurable circuit module 120 can perform a data match function without a serial processor (e.g., host processor 111).

In some embodiments, at least one memory module (e.g., 161-164) from memory package 140 stores encrypted data configured to be decrypted with a decryption key. In some embodiments, each memory module from memory package 140 stores at least a portion of a decryption key such that the at least the portion of the decryption key is deleted, scrubbed, erased, and/or altered in response to receiving an indication from a user. For example, memory package 140 can receive a signal instructing deletion of at least a portion of a decryption key. In some embodiments, such a signal can instruct deletion of the entire decryption key. In some embodiments, at least a portion of the decryption key can be erased via an actuator (not shown in FIG. 1) of the tablet computer system 101.

Operation of the actuator can be controlled and/or actuated by a user of the tablet computer system 101. In such embodiments, the user can actuate the actuator via a user-interface of the processor module 110. In some embodiments, the decryption key will be erased and the data stored in memory package 140 will remain unchanged in response to instructions to delete the decryption key. In other embodiments, each memory module from memory package 140 can store at least a portion of a decryption key such that at least the portion of the decryption key and at least a portion of data stored in memory package 140 is erased and/or altered in response to receiving an indication from a user. In some embodiments, the entire decryption key can be stored in a memory module (e.g., memory module 161) of the memory package 140.

In some embodiments, a decryption key is necessary to access and/or comprehend encrypted data stored in the memory package 140. As such, in such embodiments, when the decryption key is deleted, encrypted data stored in the memory package 140 is effectively inaccessible and/or incomprehensible. Such a process can secure data stored in the memory package 140 and prevent the data from being compromised by an undesired user of the tablet computer system 101. In some embodiments, the decryption key can be stored in more than one location, such as, for example, in memory module 161 and memory module 164. In some embodiments, for example, the decryption key can be stored in memory package 140, and can also be stored in a location separate from the tablet computer system 101. In this manner, the decryption key, and as a result, the encrypted data associated with the decryption key, can remain accessible and/or comprehensible to a desired user when the decryption key, stored in memory package 140 for example, is deleted and decryption key retrieved from the other location.

In some embodiments, the tablet computer system 101 can be implemented on a tablet computer (e.g., an iPad, an Android tablet, a Kindle Fire, etc.), a mobile communication device (e.g., a smart phone), or any other type of portable device that is capable of processing and transmitting data. In such embodiments, the peripheral devices of the processor module 110 (as shown in FIG. 1) can be internal or external devices or components of the portable device. For example, and as discussed further herein (e.g., FIG. 7), the host processor 111 of the processor module 110 can be a processor of a tablet computer, and the data match module 100 and the memory package 140 can be embedded within or externally coupled to the tablet computer. In some embodiments, the processor module 110 can be configured to interface with the reconfigurable circuit module 120 via, for example, a PCIe (Peripheral Component Interconnect Express) connection, a USB (Universal Serial Bus) connection, or any other suitable connection. In some embodiments, the data match module 100 can include low level driver software (stored and executing in hardware) that enables the tablet computer's operating system (executed by the processor module 110) to recognize and install the data match module 100 (and the memory package 140) as a peripheral device. Thus, applications on the tablet computer executed by the processor module 110 can send data match queries to and receive data match results from the data match module 100.

In some embodiments, by performing the data processing operation described herein, the data match module 100 allows the tablet computer to compare data received from one or more sensor inputs 150 with the data stored in the memory package 140. This provides the tablet computer with an on-board database that can be quickly and directly queried by the reconfigurable circuit module 120 using data received from the sensor inputs 150. Additionally, the reconfigurable circuit module 120 can process the retrieved data prior to providing the results to the processor module 110.

In some embodiments, a management utility module (not shown in FIG. 1) executing at the processor module 110 can be used to direct changes to the data stored in the memory package 140 and to execute functions that maintain an integrity of the data stored in the memory package 140. For example, the management software utility can provide instructions to the reconfigurable circuit module 120 to refresh the memory modules 161-164 to prevent the data within the memory modules 161-164 from becoming corrupted. The management software utility can also provide instructions to the reconfigurable circuit module 120 to move data from and/or to a memory module 161-164 to prevent data loss.

As discussed further herein (e.g., FIG. 7), each component and/or device of the tablet computer system 101 can be located in the same and/or different housing. For example, in some embodiments, the data match module 100 and the memory package 140 can be located in a first housing. Further to this example, the processor module 110 or a portion of the processor module 110 can be located in a second housing different and/or separate from the first housing. Even further to this example, the sensor inputs 150, or a portion thereof, can be located in the first housing, the second housing, a third housing, or a combination thereof.

Each component and/or device of the tablet computer system 101 can be operatively coupled to the remaining devices and/or components of the tablet computer system 101. For example, the processor module 110 can be operatively coupled to the sensor inputs 150 and the data match module 100 via, for example, data buses (e.g., an internal bus, an external bus). In some embodiments, the tablet computer system 101 can include more or less devices, modules and/or components than those shown in FIG. 1.

FIG. 2 is a schematic illustration of structure of a memory module 200, according to an embodiment. Memory module 200 can be structurally and functionally similar to the memory modules 161-164 shown and described in FIG. 1. As shown in FIG. 2, memory module 200 stores an address translation table 210 and other data (e.g., data 251-254). Specifically, data is stored in a number of memory segment units. For example, data 251-254 is stored in four separate memory segment units, respectively. In some embodiments, a memory segment unit can be for example, a page. In some embodiments, an address translation table can be stored in one memory segment unit (as address translation table 210 shown in FIG. 2) or across multiple memory segment units.

Each memory segment unit in memory module 200 can be identified by, for example, a physical memory address representing a physical location of the starting point of that memory segment unit. A physical memory address can be for example, a binary number from a finite monotonically ordered sequence of binary numbers that uniquely describes the physical location of a memory itself. For example, as shown in FIG. 2, the memory segment unit where address translation table 210 is stored can be identified by a physical memory address 0x000000, which represents a physical location of the starting point of that memory segment unit. In this case it is also the starting point of the memory space of memory module 200. For another example, the memory segment unit where data 251 is stored can be identified by a physical memory address 0x000100, which represents a physical location of the starting point of that memory segment unit. Furthermore, as shown in FIG. 2, the physical memory addresses of the memory segment units form a monotonically-ordered (e.g., increasing, decreasing) sequence.

In some embodiments, a memory segment unit of memory module 200 can be accessed by for example, a reprogrammable circuit module (e.g., reprogrammable circuit module 120 in FIG. 1), based on the physical memory address identifying the memory segment unit. In some embodiments, a reprogrammable circuit module can be configured to match and/or retrieve the data stored in a memory segment unit of memory module 200 using the physical memory address identifying that memory segment unit to locate a starting point for the search or retrieve operation. For example, a reprogrammable circuit module can be configured to retrieve data 252 using physical memory address 0x000106 to locate a starting point for the retrieve operation. Particularly, a reprogrammable circuit module can be configured to search address translation table 210 using 0x000000 to locate a starting point for the search.

FIG. 3 is a schematic illustration of an address translation table 300 stored in a memory module, according to an embodiment. The memory module hosting address translation table 300 can be structurally and/or functionally similar to memory modules 161-164 and/or memory module 200 shown in FIGS. 1-2. In some embodiments, an address translation table can be referred to as a block-address translation (BAT) table.

As shown in FIG. 3, address translation table 300 has two columns of entries, shown as logical memory address 310 and physical memory address 320. The first column, logical memory address 310, contains logical memory addresses (e.g., 1000, 1001, 1002, 1100), each of which uniquely identifies a logical memory address associated with a memory segment unit in a memory package including the memory module that hosts address translation table 300. A logical memory address can be in any suitable form and can represent a location, at which a memory segment unit (or other item such as a memory cell, a storage element, etc.) appears to reside from the perspective of a reprogrammable circuit module that performs a search function on the memory modules. In the example of FIG. 3, a logical memory address can be a four-digital integer, such as 1000, 1001, etc. In other embodiments a logical memory address can be in any other suitable form.

The second column, physical memory address 320, contains physical memory addresses (e.g., 361/0x002010, 362/0x006a24, 363/0x00f92a, 365/0x00ff00), each of which uniquely identifies a physical memory location of a memory segment unit in the memory package. In some embodiments, an address translation table stored in a memory module can store physical memory addresses identifying physical memory locations within other memory modules. In such embodiments, a physical memory address stored in this address translation table can include both information associated with a hosting memory module and information identifying a physical memory location within that hosting memory module. In the example of the physical memory address "361/002010" shown in FIG. 3, "161" identifies a memory module (i.e., memory module 161 shown in FIG. 1) and "002010" identifies a memory segment unit, which is represented by a physical memory address "0x002010" in the identified memory module 161 of FIG. 1. Overall, the physical memory address "361/002010" identifies the memory segment unit "0x002010" in memory module 161 of FIG. 1. Similarly, the physical memory address "362/006a24" identifies the memory segment unit "0x006a24" in memory module 162 of FIG. 1.

Address translation table 300 associates each logical memory address with a physical memory address. Specifically, each logical memory address stored in the column of logical memory addresses 310 can be mapped to a physical memory address stored in the column of physical memory addresses 320. For example, logical memory address "1000" is mapped to physical memory address "361/0x002010" in the first entry of address translation table 300. For another example, logical memory address "1001" is mapped to physical memory address "362/0x006a24" in the second entry of address translation table 300.

In some embodiments, the logical memory addresses can be stored in a logical order in address translation table 300, such as a monotonically-increasing order as shown in FIG. 3. In such embodiments, the physical memory addresses are not necessarily stored in any logical order in address translation table 300. For example, the logical memory address stored in the first entry of address translation table 300 (i.e., 1000) is adjacent to the logical memory address stored in the second entry of address translation table 300 (i.e., 1001), while the physical memory address stored in the first entry (i.e., 361/0x002010), is not adjacent to the physical memory address stored in the second entry (i.e., 362/0x006a24). In fact, the two physical memory addresses identify two memory segment units in two different memory modules. In other embodiments, physical memory addresses can be stored in a logical order in address translation table 300.

In use, in some embodiments, a reprogrammable circuit module can be configured to associate a physical memory address with a logical memory address stored in an address translation table. That is, the reprogrammable circuit module can be configured to assign a physical memory address to each logical memory address, and then store the pair of addresses (i.e., the physical memory address and the logical memory address) as an entry in the address translation table. Furthermore, in some embodiments, the reprogrammable circuit module can be configured to randomly assign a physical memory address to a logical memory address, such that the logical memory addresses are stored in a logical order in the address translation table, while the physical memory addresses associated with those logical memory addresses are randomly distributed across the entire available memory space provided by the memory modules.

Figure 4:
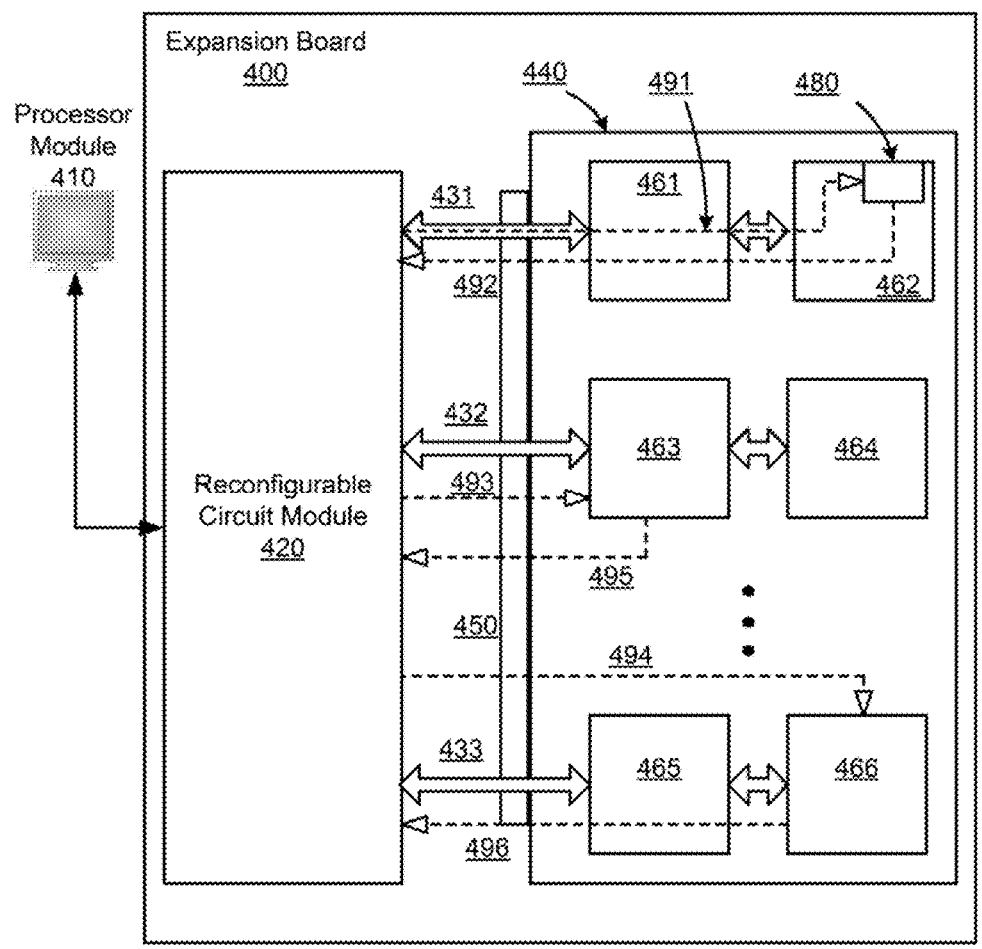
FIG. 4 is a schematic illustration of a reprogrammable circuit module configured to execute a data match process, according to an embodiment.

In some embodiments, a Scalable Large Flash Memory (SLFM) system can be used to execute a data match function. FIG. 4 is a schematic illustration of such an SLFM system, including a reprogrammable circuit module 420 that is configured to execute a data match process on a memory package 440, according to an embodiment. The structure of the system in FIG. 4 is similar to that of the system shown in FIG. 1. Specifically, reprogrammable circuit module 420 is a portion of an expansion board 400, which is operatively coupled to a processor module 410. A set of memory modules, including memory modules 461-466, are included in a replaceable memory package 440 that is coupled to the expansion board 400 via a socket 450. Each memory module from the set of memory modules in the memory package 440 is operatively coupled to reprogrammable circuit module 420 via a data channel, such as data channel 431-433. These components can be structurally and/or functionally similar to those in FIG. 1.

A data match process can be executed by the system shown in FIG. 4 as follows. Initially, a query is formulated in processor module 410, by for example, an operator or a user of processor module 410 and/or a program or application executing on processor module 410. An application executing on processor module 410 can then be configured to translate the query into a set of machine executable tasks. In some embodiments, such a machine executable task can be for example, a string or a term of a predefined format (e.g., a fixed length) that can be matched against data stored in the memory modules on the memory package 440. Thus, the query is translated into a set of matchable strings or terms at processor module 410.

In some embodiments, one or more logical memory addresses associated with a searchable and/or matchable (e.g., matchable can include partially matchable, completely matchable, and/or exactly matchable) string or term can be determined based on the string or term. Specifically, a logical memory address is associated with a string or term in a sense that data stored in the memory segment unit 461-466 represented by the logical memory address is likely to contain information associated with the string or term. Thus, to match the string or term, data stored in the memory segment unit 461-466 represented by the logical memory address can be matched. In some embodiments, the desired logical memory addresses can be determined at reconfigurable circuit module 420 or another component of the system (not shown in FIG. 4). Similarly stated, reconfigurable circuit module 420 can determine, based on sensed data and/or instructions from a user, a set of addresses (e.g., a physical address, a logical address) of data to be searched. As a result, one or more logical memory addresses associated with the matchable (e.g., matchable can include partially matchable, completely matchable, and/or exactly matchable) string or term are available at reprogrammable circuit module 420.

Next, reprogrammable circuit module 420 can be configured to send an address-translation query including the desired logical memory addresses to an address translation table stored in a memory module in the memory package 440 via a data channel. As shown in FIG. 4, reprogrammable circuit module 420 is configured to send an address-translation query, via data channel 431 (shown as data path 491), to memory module 462 contained in the memory package 440, where an address translation table 480 is stored. Similar to address translation table 180 shown in FIG. 1, address translation table 480 is associated with the memory modules 461-466 contained in the memory package 440. That is, at least one memory segment unit in each memory module contained in the memory package 440 is associated with an entry stored in address translation table 480. In the example of FIG. 4, the address-translation query sent from reprogrammable circuit module 420 to memory module 462 includes the desired logical memory addresses 1001 and 1002.

In some embodiments, reprogrammable circuit module 420 can be configured to send multiple address-translation queries, each of which contains a different set of logical memory addresses and is destined to a different address translation table. For example, although not shown in FIG. 4, if entries associated with logical memory address 1001 and 1002 are stored in two different address translation tables in the memory package 440, then reprogrammable circuit module 420 can be configured to send a first address-translation query containing logical memory address 1001 to a first address translation table that includes an entry for logical memory address 1001, and send a second address-translation query containing logical memory address 1002 to a second address translation table that includes an entry for logical memory address 1002. Thus, the logical memory addresses are each included in an address-translation query that is sent to an appropriate address translation table containing an entry for the logical memory address.

After an address-translation query containing a logical memory address is received at an address translation table, an entry associated with the logical memory address can be determined based on the logical memory address. A physical memory address associated with the logical memory address can be retrieved from the entry, and sent to reprogrammable circuit module 420 via a data channel. In the example of FIG. 4, if address translation table 480 includes the same entries of address translation table 300 as shown in FIG. 3, then physical memory address "362/0x006a24" is associated with logical memory address 1001 and physical memory address "363/0x00f92a" is associated with logical memory address 1002. That is, logical memory address 1001 points to a memory segment unit in memory module 462, which is identified by a physical memory address of "0x006a24" in memory module 462; and logical memory address 1002 points to a memory segment unit in memory module 463, which is identified by a physical memory address of "0x00f92a" in memory module 463. As a result of memory module 462 receiving the address-translation query containing logical memory addresses 1001 and 1002, physical memory addresses "362/0x006a24" and "363/0x00f92a" are retrieved from address translation table 480 and sent to reprogrammable circuit module 420 via data channel 431 (shown as data path 492 in FIG. 4). Thus, a desired logical memory address available at reprogrammable circuit module 420 is used to retrieve a physical memory address, which can be used to locate a specific memory segment unit in a memory module within the memory package 440.

Subsequently, reprogrammable circuit module 420 can be configured to send one or more data queries to one or more memory segment units, each of which is identified by a retrieved physical memory address associated with a logical memory address. Specifically, a data query destined to a memory segment unit in a memory module within the memory package 440 can be sent over a data channel connecting reprogrammable circuit module 420 and the memory modules 461-466. Furthermore, in some embodiments, multiple data queries to different memory modules can be sent from reprogrammable circuit module 420 at substantially a same time. In other words, a first data query can be sent to a first memory module during a first time period, and a second data query can be sent to a second memory module during a second time period overlapping the first time period. Thus, sending multiple data queries or retrieving data from multiple memory modules can be performed in a substantially simultaneous fashion via multiple data channels.

In the example of FIG. 4, after logical memory address 1001 and 1002 are translated into physical memory address "362/0x006a24" and "363/0x00f92a", reprogrammable circuit module 420 is configured to send a first data query to a memory segment unit identified by physical memory address "0x00f92a" in memory module 463 via data channel 432 (shown as data path 493), and a second data query to a memory segment unit identified by physical memory address "0x00ff00" in memory module 465 via data channel 433 (shown as data path 494). The first data query and the second data query can be sent at substantially a same time, and subsequently, data can be retrieved from memory module 463 and memory module 466 during a substantially same time period (shown as data path 495 and 496, respectively).

A data query sent from reprogrammable circuit module 420 to a memory segment unit in a memory module is designed to retrieve data from the memory segment unit. In some embodiments, data stored in the memory segment unit can be retrieved completely and the original data can be sent to reprogrammable circuit module 420 for further processing. In some other embodiments, data stored in the memory segment unit can be partially retrieved and sent to reprogrammable circuit module 420 for further processing, according to the data query. Further processing can include for example, searching and/or matching the desired string or term in the original data or processed data. Such further processing can be performed at reprogrammable circuit module 420, or alternatively, at another component of processor module 410.

In some embodiments, the associations between logical memory addresses and physical memory addresses with respect to memory segment units contained in a memory package can be stored in one or more address translation tables included in the memory package. In other words, the remapping information (e.g., between logical memory addresses and physical memory addresses) for a memory package can be stored by the one or more address translation tables included in the memory package. As a result, the memory package can be swapped from one circuit board to another that is suitable for the memory package, without loosing the remapping information. In the example of FIG. 4, address translation table 480 is configured to store the remapping information for the memory package 440. Therefore, the memory package 440 can be removed from the expansion board 400 and coupled to a different circuit board, where a task (e.g., a data match function) can be executed in a substantially same way by a different reprogrammable circuit module as when the memory package 440 is coupled to the expansion board 400. In such embodiments, a memory package and/or a circuit board can be removably coupled to and/or removably disposed within a housing of the tablet computer system (e.g., tablet computer systems 101, 601, 701). The housing can be functionally and/or structurally similar to the first housing 610 in FIGS. 6A and 6B, as described further herein.

FIG. 5 is a flow chart illustrating a method 500 for performing a data match function, according to an embodiment. The method 500 can be executed by a tablet computer system that is similar to the tablet computer system 101 shown and described with respect to FIG. 1. As described herein, the tablet computer system can be implemented on a tablet computer that includes a reconfigurable circuit module (e.g., the reconfigurable circuit module 110 in FIG. 1) and a set of memory modules (e.g., the memory modules 161-164 in FIG. 1). Memory of the tablet computer can be, for example, a non-transitory processor-readable medium. The code representing instructions to perform the method 500 can be stored in the non-transitory processor-readable medium of the tablet computer, and executed by a processor of the tablet computer. The code includes code to be executed by the processor to cause the processor to operate the functions illustrated in FIG. 5 and described as follows.

At 502, the reconfigurable circuit module (e.g., the reconfigurable circuit module 110 in FIG. 1) can receive data (e.g., sensed data) and/or a representation of data from a sensing device (e.g., the sensing device 150 in FIG. 1). The sensing device can be any type of sensing device embedded within or externally connected to the tablet computer. For example, the sensing device can be a camera of the tablet computer. For another example, the sensing device can be a GPS device connected to the tablet computer. In some embodiments, the sensing device can be wirelessly connected to the tablet computer. For example, the sensing device can be a biometric scanner wirelessly connected to the tablet computer. The data can be data sensed by the sensing device such as, for example, an image captured by a camera, an audio clip recorded by an a microphone, temperature data measured by a temperature sensor, position data measured by a GPS, a fingerprint captured and/or analyzed by a biometric device, etc.

At 504, the reconfigurable circuit module can define a data match query based on the data received from the sensing device. In other embodiments, the data match query can be defined by a device other than the reconfigurable circuit module, such as, for example, the processor module 110 in FIG. 1. In such instances, the reconfigurable circuit module can receive the data match query from the host processor. The data match query can be associated with, for example, validating the received data against data stored in a database, data matching data that matches (e.g., matches can include partial, complete and/or exact matches) the received data, comparing the received data with data stored in a memory (e.g., the memory modules 161-164 in FIG. 1), and/or the like. In some embodiments, the data match query can include an instruction or indication for the data match operation. In some embodiments, the data match query can include at least a portion (e.g., a keyword) of the received data. In some embodiments, the data match query can include an indication of requirement on the data match result (e.g., format, content, etc.). The reconfigurable circuit module can retrieve, based on the received data (e.g. sensed data from a sensing device), data stored at the set of memory modules (e.g., the memory modules 161-164 in FIG. 1).

At 506, the reconfigurable circuit module can compare the retrieved data to the sensed data and/or the representation of the sensed data. The reconfigurable circuit module can produce matched data (e.g., matched data can include (1) stored data and/or retrieved data that at least partially matches the representation of the sensed data, and/or (2) stored data and/or retrieved data that completely and/or exactly matches the representation of the sensed data) in response to the comparison.

At 508, the reconfigurable circuit module can send a data match result. The data match result can be based on the matched data. In some embodiments, the data match result can include at least a portion of the matched data. The data match result can also include data associated with the matched data. In other embodiments, the data match result can include data associated with the matched data but not include the matched data. For example, the data match result can include a result of a logic operation (e.g., an AND operation) and/or a mathematic operation (e.g., counting the number of occurrence of a keyword) performed on the retrieved data and/or the sensed data.

Figure 6A:
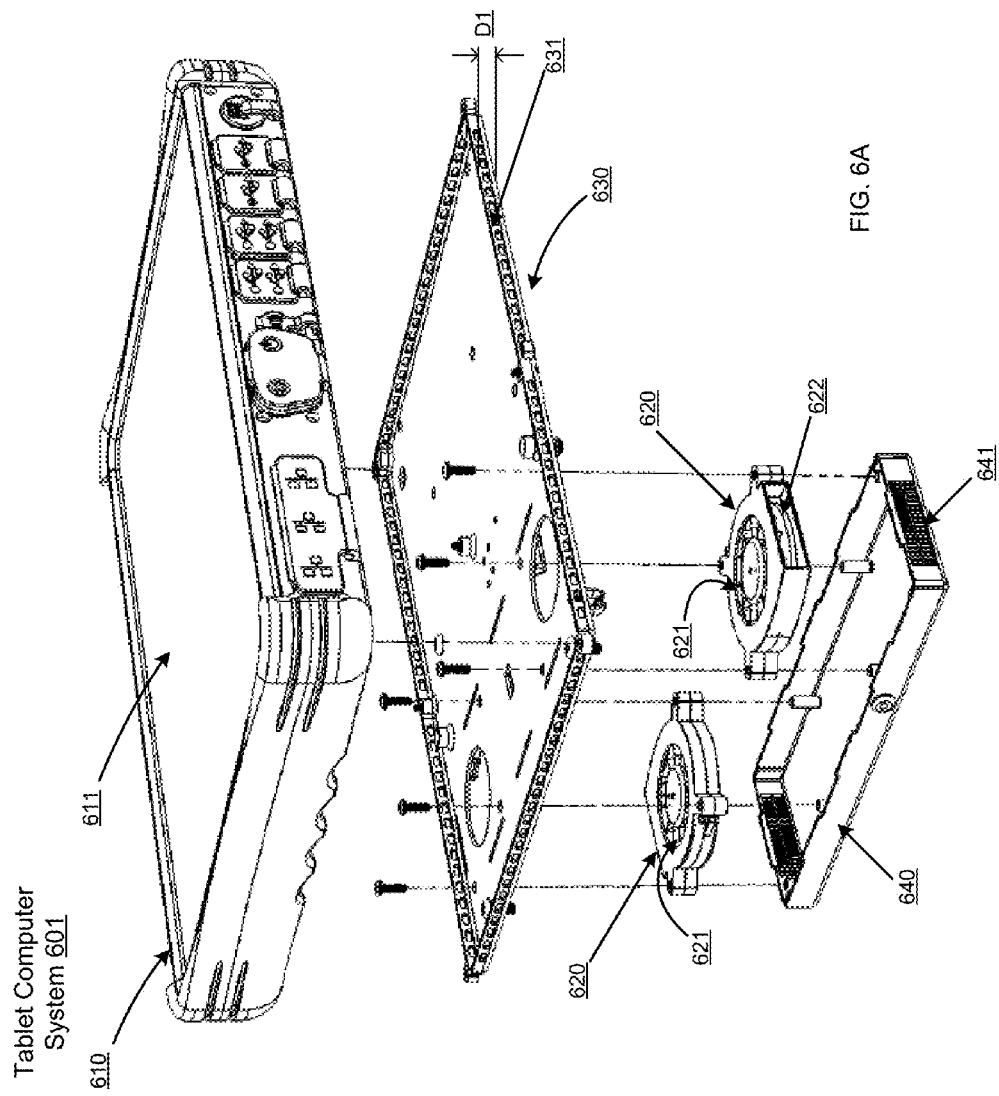
FIGS. 6A and 6B are exploded views of a tablet computer system, according to an embodiment.
Figure 6B:
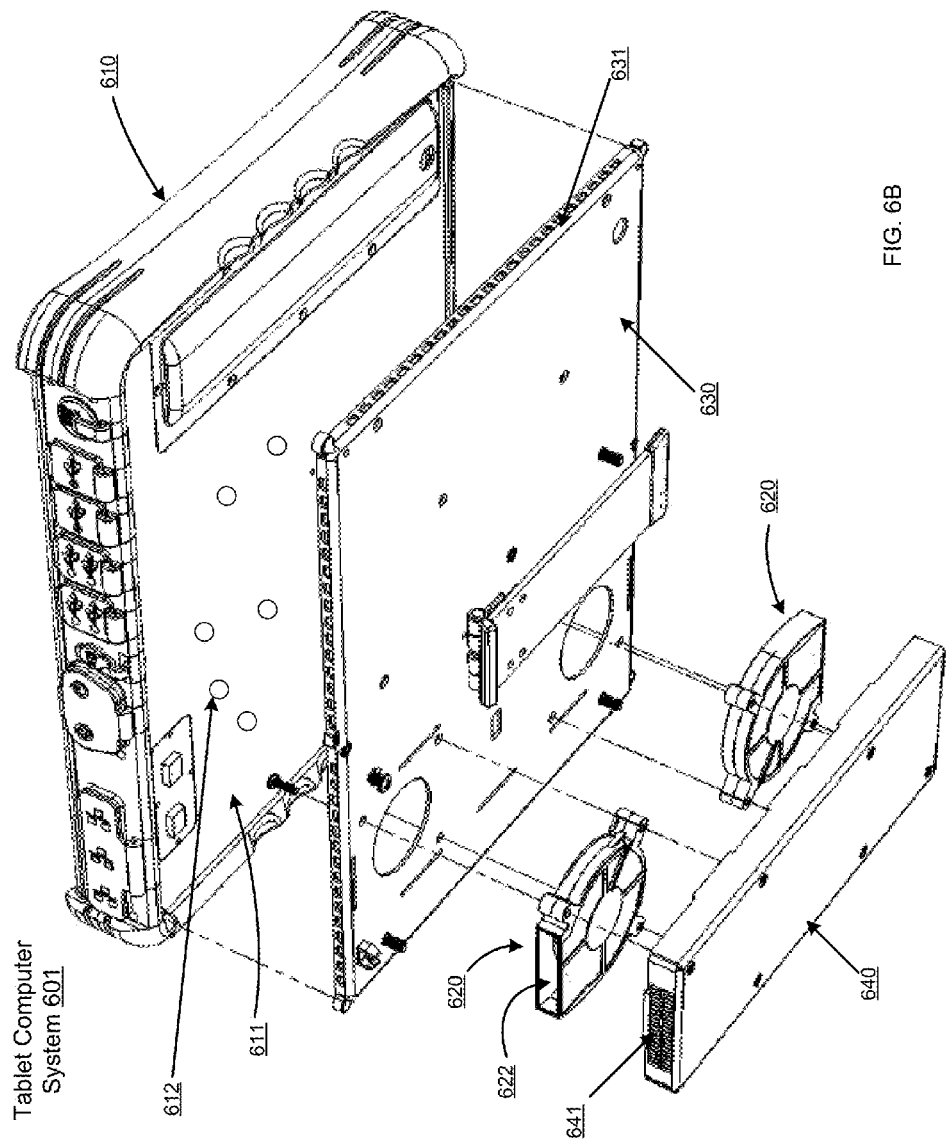

FIGS. 6A and 6B are exploded views of a tablet computer system 601, according to an embodiment. In some embodiments, the tablet computer system 601, for example, can have a length of approximately 9-11 inches, a width of approximately 7-10 inches, and a depth of approximately 0.5-4 inches. In some embodiments, the tablet computer system 601 can have a length, width, and/or depth greater than or less than the examples discussed herein.

As shown in FIGS. 6A and 6B, in some embodiments, the tablet computer system 601 includes a first housing 610, a cooling module 620, a second housing 630, and a cooling module enclosure 640. In some embodiments, the first housing 610, cooling module 620, second housing 630, and/or cooling module enclosure 640 can be removably and/or permanently coupled to each other. As discussed in further detail herein, in some embodiments, the tablet computer system 601 can employ a cooling system using conduction and radiation within and at the first housing 610, and convection external to the first housing 610. In this manner, in such embodiments, the first housing 610 can be substantially hermetically sealed such that a portion of the tablet computer system 601 can be substantially protected from potentially adverse environmental conditions. Similarly stated, in such embodiments, a portion (e.g., memory package 140 in FIG. 1) of the tablet computer system 601 can be substantially secured from undesired users.

The first housing 610 can include any material configured to facilitate thermal energy transfer. In some embodiments, the material can be configured to provide strength and/or rigidity so as to protect internal components from environmental stress and/or damage. In some embodiments, for example, the first housing 610 can include an aluminum alloy (e.g., Aluminum Alloy 6061-T6). In some embodiments, the first housing 610 can be monolithically formed. In some embodiments, the first housing 610 can be substantially hermetically sealed (e.g., impenetrable to liquid).

The first housing 610 includes a display device 611. Sensor inputs (e.g., sensor inputs 150 in FIG. 1) and/or sensor devices (not shown; e.g., a camera, a video recorder, an audio capture device, a bio scanner, and a GPS) can be included within and/or coupled to the first housing 610. A processor module (e.g., processor module 110 in FIG. 1) can be included within and/or coupled to the first housing 610. A data match module (e.g., data match module 100 in FIG. 1) having a reconfigurable circuit module (e.g., reconfigurable circuit module 120 in FIG. 1) can be included within and/or coupled to the first housing 610. A set of memory modules configured to store data (e.g., memory package 140 in FIG. 1) can be included within and/or coupled to the first housing 610. A set of protrusions 612 can be included within and/or coupled to an external surface portion 611 of the first housing 610. For example, the set of protrusions can be disposed about an external surface portion 611 of the first housing 610. A heat sink (not shown) can be included within the first housing 610. In some embodiments, such internal components (e.g., a reconfigurable circuit module, a set of memory modules, etc.) can be removably situated within the first housing 610. As such, a user of the tablet computer system 601 can access the components within the first housing. For example, a user of the tablet computer system 601 can swap a memory module within the first housing 610 with a different memory module.

In some embodiments, a reconfigurable circuit module (not shown) has multiple side portions (not shown), each side portion from the multiple side portions can be disposed adjacent to a memory module from the set of memory modules (not shown). In such embodiments, thermal energy generated at the reconfigurable circuit module can be distributed such that thermal energy build-up in any one particular area can be limited. For example, the memory modules from the set of memory modules can be disposed relative to the reconfigurable circuit module such that thermal energy can be distributed in a substantially symmetrical, uniform, and/or even pattern. Such an arrangement can limit thermal energy build-up in undesirable locations within tablet computer system 601.

In some embodiments, the heat sink can be made from any appropriate and/or conductive material configured to transfer thermal energy with minimal thermal resistance. Such a material, for example, can be copper. The copper layer, for example, can be disposed in the first enclosure 610 in such a way as to contact a least a portion of a thermal energy generating component (e.g., reconfigurable circuit module). In this manner, the copper layer can transfer thermal energy from the reconfigurable circuit module, or any other thermal energy generating component (e.g., memory modules, a reconfigurable circuit module, a battery, a sensing device, a power component, a processing module, etc.) of the first housing 610 for which thermal energy transfer is desired. Such thermal energy, for example, can be transferred to an internal surface (not shown) of the first housing 610 via conduction. Further to this example, the thermal energy can subsequently be transferred from the internal surface of the first housing to an external surface portion 611 of the first housing 610 and/or to a set of protrusions 612. The thermal energy can then be transferred to an area external to and/or separate from the first housing 610 via convection using a cooling module 620. In this manner, thermal energy generated by the tablet computer system 601 can dissipate and/or be removed from the tablet computer system 601. Such embodiments allow the tablet computer system 601 to operate in various environmental conditions (e.g., a hot climate) without overheating or becoming susceptible to excessive heat capable of damaging a component of the tablet computer system 601.

In some embodiments, the set of protrusions 612 can be configured to facilitate transfer of thermal energy from a thermal energy generating component to an area external to the first housing 610. In some embodiments, the set of protrusions 612 can protrude through the external surface portion 611 of the first housing 610, such that, for example, the set of protrusions 612 can provide for an increased surface area between the external surface portion 611 of the first housing 610 and the second housing 603. Such additional surface area can facilitate the dissipation of thermal energy from the first housing 610. In some embodiments the set of protrusions 612 can be arranged in any shape, form, and/or pattern. In such embodiments, the set of protrusions can be configured to receive thermal energy generated within the first housing 610 from the heat sink (e.g., copper layer) and/or from the external surface portion 611 of the first housing 610. In such instances, thermal energy can transition (e.g., via conduction) from a thermal energy generating component to a protrusion from the set of protrusions 612 via the heat sink. In this manner, the thermal energy can transfer from an internal surface portion (not shown) of a protrusion from the set of protrusions 612 to an external portion of the protrusion from the set of protrusions 612. From the first housing 610, the thermal energy can transition to each protrusion from the set of protrusions 612. Similar to previous discussion, thermal energy can then be transferred to an area external to and/or separate from the first housing 610 via convection. In some embodiments, a fastener (not shown) can be coupled to the heat sink and a protrusion from the set of protrusions. In this manner, the fastener can facilitate thermal energy transfer to the protrusion from the set of protrusions 612. In some embodiments, for example, thermal energy dissipation can be about 20-60 watts. In some embodiments, for example, thermal energy dissipation can be greater than or less than about 20-60 watts.

In some embodiments, a cooling module 620 can be configured to facilitate thermal energy transfer via convection. In some embodiments, for example, the cooling module 620 can include one or more fans (e.g., an axial blower fan). In some embodiments, the cooling module 620 can be disposed approximately beneath and/or in alignment with a reconfigurable circuit module (reconfigurable circuit module 120 in FIG. 1) and/or a processor module (e.g., processor module 110 in FIG. 1). In this manner, the cooling module 620 can be disposed in an area that can likely be exposed to a relatively high level of thermal energy. Such a location of the cooling module 620 can establish a relatively high fan generated air flow rate in an area the can be susceptible to a relatively high level of thermal energy. Although shown in FIGS. 6A and 6B as an axial blower fan, in some embodiments, the cooling module 620 can be any type of cooling device capable of facilitating a transfer of thermal energy from the first housing 610. In some embodiments, for example, liquid coolant can be used. In such embodiments, for example, the coolant can be re-circulated during operation of the cooling module 620.

In some embodiments, a second housing 630 defines a set of slots 631. The second housing 630 can include and/or be coupled to at least a portion of a cooling module 620. In some embodiments, the second housing 630 can be coupled to the first housing 610. In such embodiments, a void (as illustrated by distance D1 in FIG. 6A) can be established between a surface portion of the second housing 630 and an external surface portion 611 of the first housing 610. The void, for example, can be configured to facilitate thermal energy transfer (e.g., convective cooling) between the first housing 610 and the second housing 630. For example, the void (e.g., air gap, air flow pathway) can be such that a distance D1 (FIG. 6A) between the surface portion of the first housing 610 and the external surface portion 611 of the second housing 630 is approximately 0.1-0.5 inches. In other embodiments, the distance D1 can be more or less than 0.1-0.5 inches. In some embodiments, the set of slots 631 can facilitate thermal energy transfer from the first housing 610 to an area external to the first housing 610. For example, cooling module 620 can facilitate air flow from the environment, through the set of slots 631 (e.g., ingress ports), through the cooling module, and back to the environment.

In some embodiments, the second housing 630 can be monolithically formed. In other embodiments, the second housing 630 can be constructed from multiple different components that are joined together. In such embodiments, for example, the multiple different components can be coupled via a press fit, a threaded coupling, a mechanical fastener, and/or the like.

In some embodiments, a cooling module enclosure 640 can include an exhaust portion 641. The exhaust portion 641 can define exhaust slots and/or voids in the cooling module enclosure 641. Such slots can be configured in any manner such that air can flow through the cooling module enclosure 640. The cooling module enclosure 640 can be configured to at least partially enclose cooling module 620. The cooling module enclosure 641 can be coupled to the second housing 630, the cooling module 620, and/or the first housing 610.

In use, the cooling module enclosure 640 can protect the cooling module and facilitate thermal energy transfer from the tablet computer system 601 to an area external to the tablet computer system 601. For example, thermal energy can be transferred from the first housing 610, through the cooling module 620, and to the environment through exhaust portion 641. As another example, air can flow through the set of slots 631 of the second housing 630, through the cooling module 620 (e.g., in via an inlet portion of the cooling module 620 and out via an outlet portion of the cooling module), into the cooling module enclosure 640, and through an exhaust portion 641 of the cooling module enclosure 640. In such instances, thermal energy can be transferred from the tablet computer system 601 to an area external to and/or separate from the tablet computer system 601. In some embodiments, air can flow in a direction opposite to the air flow direction previously described herein. In such embodiments, for example, air can flow into the exhaust portion 641 of the cooling module enclosure 640, through the cooling module 620, and through the set of slots 6301 of the second housing 630, to an area external to and/or separate from the tablet computer system 601.

In some embodiments, the cooling module enclosure 640 can be monolithically formed. In other embodiments, the cooling module 640 can be constructed from multiple different components that are joined together. In such embodiments, for example, the multiple different components can be coupled via a press fit, a threaded coupling, a mechanical fastener, and/or the like.

In some embodiments, the first housing 610 can include an actuator configured to cause deletion of a decryption key associated with encrypted data stored at a memory module (e.g., memory modules 161-164 in FIG. 1) from the set of memory modules (e.g., memory package 140 in FIG. 1), as previously described herein. In some embodiments, the actuator can be actuated via physical contact (e.g., user interface) at the tablet computer system 601. In some embodiments, the actuator can be actuated via a signal at the tablet computer system 601 based at least in part on an indication generated external to the tablet computer system 601. In such a manner, the signal can be transferred to the tablet computer system 601 via a network connection, wired connection, and/or wireless connection (e.g., similar to the connections described with respect to FIG. 1).

In use, in some embodiments, thermal energy can dissipate and/or be removed from the tablet computer system 601 such that the tablet computer system 601 can operate at acceptable temperatures. Sufficient thermal energy dissipation and/or removal, in some embodiments, can be important when high power components of the tablet computer system 601 are operating, such as, for example, a reconfigurable circuit module. In such embodiments, thermal energy can transfer from a thermal energy generating component within the first housing 610 to the heat sink (not shown, e.g., copper layers, thermal pathways) within the first housing 610. The thermal energy can then be transferred from the heat sink (not shown) to a protrusion from the set of protrusions 612. From the set of protrusions 612, the thermal energy transfer through the void (e.g., facilitated by air flow), as shown by distance D1 in FIG. 6A. Such air flow can be generated by the cooling module 620. In some embodiments, the air flow, or any other cooling medium, can flow through the set of slots 631 defined by the second housing 630. The thermal energy can then transfer (e.g., via convection) into the inlet portion 621 of the cooling module 620, through the cooling module 620, and out of the exit portion 622 of the cooling module 620. The thermal energy can the transfer from the exit portion 622 of the cooling module 620 through the exhaust portion 641 of the cooling module enclosure 641, and into an area external to the tablet computer system 601.

Figure 7:
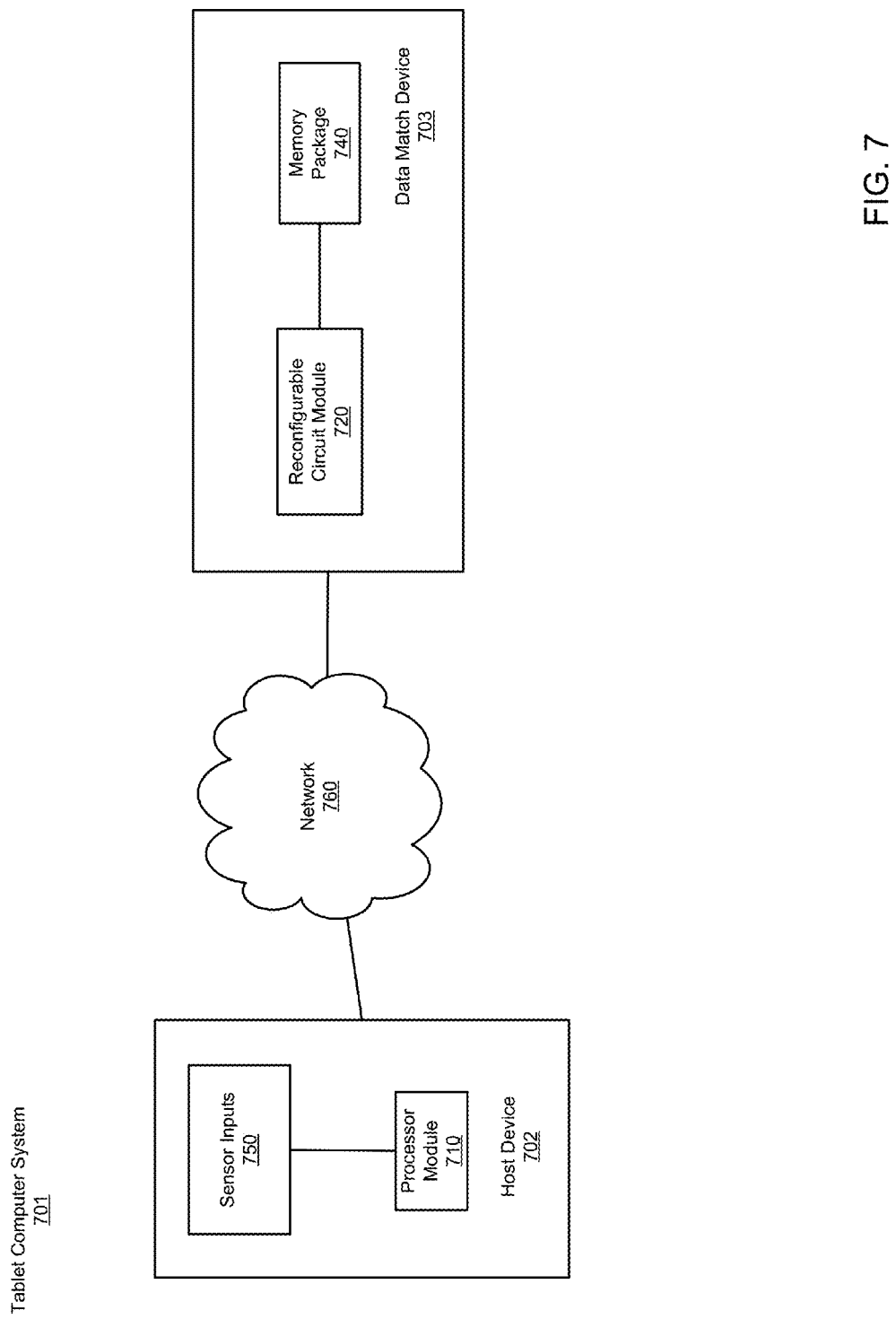
FIG. 7 is a schematic illustration of a tablet computer system, according to an embodiment.

FIG. 7 is a schematic illustration of a tablet computer system 701, according to an embodiment. The tablet computer system 701 can be functionally similar to the tablet computer systems 101 and 601, in FIG. 1 and FIGS. 6A and 6B, respectively. The tablet computer system 701 includes a host device 702 and a data match device 703. The host device 702 and/or the data match device 703 can be portable tablet form factor devices similar to tablet computer systems 101 and 601. In some embodiments, the host device 702 can be smaller in size and/or lighter in weight than the data match device 703. For example, in some embodiments, the host device 702 can be a similar and/or smaller in size and/or weight to a tablet form factor device. Further to this example, the data match device 703 can be a similar and/or larger in size and/or weight to a tablet form factor device.

The host device 702 includes a processor module 710 and sensor inputs 750. Processor module 710 can be structurally and functionally similar to the processor module 110 in FIG. 1. Sensor inputs 750 can be structurally and functionally similar to sensor inputs 150 in FIG. 1. The data match device 703 can be structurally and functionally similar to the data match module 100 in FIG. 1. The data match device 703 includes a reconfigurable circuit module 720 and a memory package 740. The reconfigurable circuit module 720 can be structurally and functionally similar to the reconfigurable circuit module 120 in FIG. 1. The memory package 740 can be structurally and functionally similar to memory package 140 in FIG. 1.

In use, the host device 702 can be operatively coupled to the data match device 703. In such embodiments, the host device 701 can communicate with the data match device 703 via a network connection, wired connection, and/or a wireless connection (e.g., via network 760). Such wired connections can include, for example, USB, Ethernet, Fiber Optic, FireWire, PCIe, etc. Such wireless network connections can include, for example, Bluetooth, Wifi, Cellular, WiMax, etc. In such embodiments, for example, the reconfigurable circuit module 720 of the data match device 703 can receive sensed data from sensor inputs 750 of the host device 702.

In use, in some embodiments, the tablet computer system 701 can function similar to tablet computer system 101 and/or 601. In use, one or more sensor inputs 750 (e.g., a biometric sensor) can receive and/or capture sensed data (e.g., data associated with a person's fingerprint). A representation of the sensed data can be sent from the host device 702 (e.g., via the processor module 710), to the data match device 703 via the network 760. In some embodiments, the sensed data can be sent from the sensor inputs 750 directly to the data match device 703 and not via the processor module 710. In some embodiments, the host device 702 can send a data match request via network 760 to the data match device 703 (e.g., to the reconfigurable circuit module 720). The reconfigurable circuit module 720 can receive the representation of the sensed data and/or the data match request. In such instances, the reconfigurable circuit module 720, in response to receiving the representation of the sensed data and/or the data match request, can transition from a first configuration to a second configuration. The transition from the first configuration to the second configuration can include reconfiguring a logic component (e.g., logic gate) or set of logic components of the reconfigurable circuit module 720. In some embodiments, the reconfigurable circuit module 720 can retrieve, based on the representation of the sensed data and when in the second configuration, data stored in the memory package 740, via, for example, a memory bus or a set of memory buses. In some embodiments, the reconfigurable circuit module 720 can process the retrieved data at the reconfigurable circuit module 720 and subsequently define a search result based on the processing. Such processing can include data matching (e.g., data matching can include partial data matching, complete data matching, and/or exact data matching), data filtering, data translation, data normalization, data filtration, and/or the like. In some embodiments, the reconfigurable circuit module 720 can send the search result to the host device 702, via, for example, network 760.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. An apparatus, comprising:

a plurality of memory modules disposed within a portable housing and configured to store data; and a reconfigurable circuit module disposed within the portable housing and operatively coupled to the plurality of memory modules, the reconfigurable circuit module configured to be operatively coupled to a sensing device and a host processor, the reconfigurable circuit module configured to receive a representation of sensed data generated at the sensing device, the reconfigurable circuit module configured to receive the representation of the sensed data from the host processor when a frequency associated with the sensed data meets a criterion, the reconfigurable circuit module configured to receive the representation of the sensed data from the sensing device and not the host processor when the frequency associated with the sensed data does not meet the criterion, the reconfigurable circuit module configured to transition from a first configuration to a second configuration in response to receiving the representation of the sensed data, the reconfigurable circuit module configured to retrieve, based on the representation of the sensed data and when in the second configuration, data stored in at least one memory module from the plurality of memory modules, the reconfigurable circuit module configured to compare the retrieved data to the representation of the sensed data to produce matched data, the reconfigurable circuit module configured to send a data match result based on the matched data.

2. The apparatus of claim 1, wherein the reconfigurable circuit module is configured to determine, based on the representation of the sensed data and when in the second configuration, a set of addresses of data from the plurality of memory modules, the reconfigurable circuit module configured to retrieve the data stored in the plurality of memory modules based at least in part on the set of addresses.

3. The apparatus of claim 1, wherein the reconfigurable circuit module is configured to be operatively coupled to the host processor disposed within the portable housing, the reconfigurable circuit module configured to determine, based on a data match request defined by the host processor and based at least in part on the sensed data, a set of addresses of data stored in the plurality of memory modules, the reconfigurable circuit module configured to retrieve the data stored in the plurality of memory modules based at least in part on the set of addresses.

4. The apparatus of claim 1, wherein the plurality of memory modules are configured to store data having a plurality of addresses, the reconfigurable circuit module configured to be operatively coupled to the host processor disposed within the portable housing, the reconfigurable circuit module configured to determine, based on a data match request defined by the host processor and based at least in part on the sensed data, a set of addresses from the plurality of addresses and of data from the plurality of memory modules, the set of addresses being different from the plurality of addresses, the reconfigurable circuit module configured to retrieve the data stored in the plurality of memory modules based at least in part on the set of addresses.

5. The apparatus of claim 1, wherein the reconfigurable circuit module is configured to retrieve a portion of the data from the plurality of memory modules, the reconfigurable circuit module configured to send the data match result to the host processor, the data match result including a representation of the portion of the data.

6. The apparatus of claim 1, wherein the reconfigurable circuit module is configured to receive a data match request via a user-interface, the reconfigurable circuit module configured to retrieve, based at least in part on the data match request and when in the second configuration, the data stored in the plurality of memory modules.

7. The apparatus of claim 1, wherein the transition from the first configuration to the second configuration includes reconfiguring a plurality of logic components of the reconfigurable circuit module.

8. The apparatus of claim 1, wherein the reprogrammable circuit module is a Field Programmable Gate Array (FPGA).

9. The apparatus of claim 1, wherein each memory module from the plurality of memory modules is a flash memory module.

10. An apparatus, comprising:
a plurality of memory modules disposed within a portable housing and configured to store data having a plurality of addresses; and
a reconfigurable circuit module disposed within the portable housing and operatively coupled to the plurality of memory modules, the reconfigurable circuit module configured to be operatively coupled to a host processor operatively coupled to a sensing device, the reconfigurable circuit module configured to receive a representation of sensed data generated at the sensing device, the reconfigurable circuit module configured to receive the representation of the sensed data from the host processor when a frequency associated with the sensed data meets a criterion, the reconfigurable circuit module configured to receive the representation of the sensed data from the sensing device and not the host processor when the frequency associated with the sensed data does not meet the criterion,
the reconfigurable circuit module configured to transition from a first configuration to a second configuration in response to receiving the representation of the sensed data, the reconfigurable circuit module configured to determine, based on the representation of the sensed data and when in the second configuration, a set of addresses from the plurality of addresses and of data from the plurality of memory modules, the set of addresses being different from the plurality of addresses, the reconfigurable circuit module configured search the data from the plurality of memory modules based at least in part on the set of addresses, the reconfigurable circuit module configured to define a search result based at least in part on the search, the reconfigurable circuit module configured to send a representation of the search result to the host processor.

11. The apparatus of claim 10, wherein the transition from the first configuration to the second configuration includes reconfiguring a plurality of logic components of the reconfigurable circuit module.

12. The apparatus of claim 10, wherein the representation of the sensed data is received at the reprogrammable circuit module based at least in part on a request from a user via a user-interface.

13. The apparatus of claim 10, wherein the reconfigurable circuit module is configured to retrieve a portion of the data from the plurality of memory modules, the search result including a representation of the portion of the data.

14. An apparatus, comprising:
a plurality of memory modules disposed within a portable housing and configured to store data; and
a reconfigurable circuit module disposed within the portable housing and operatively coupled to the plurality of memory modules, the reconfigurable circuit module configured to be operatively coupled to a sensing device and a host processor, the reconfigurable circuit module configured to receive a representation of sensed data generated at the sensing device, the reconfigurable circuit module configured to receive the representation of the sensed data from the host processor when a frequency associated with the sensed data meets a criterion, the reconfigurable circuit module configured to receive the representation of the sensed data from the sensing device and not the host processor when the frequency associated with the sensed data does not meet the criterion,
the reconfigurable circuit module configured to transition from a first configuration to a second configuration in response to receiving the representation of the sensed data, the transition from the first configuration to the second configuration including reconfiguring a plurality of logic components of the reconfigurable circuit module, the reconfigurable circuit module configured to retrieve, based on the representation of the sensed data and when in the second configuration, data stored in at least one memory module from the plurality of memory modules, the reconfigurable circuit module configured to compare the retrieved data to the representation of the sensed data to produce matched data.

15. The apparatus of claim 14, wherein the reprogrammable circuit module is configured to be modified by a driver module.

16. The apparatus of claim 14, wherein the reconfigurable circuit module is configured to send a data match result based on the matched data.

17. The apparatus of claim 14, wherein the reconfigurable circuit module is configured to transition from the first configuration to the second configuration at least in part in response to receiving an indication from a user via a user-interface.

18. The apparatus of claim 14, wherein the reprogrammable circuit module is a Field Programmable Gate Array (FPGA).

* * * * *